United States Patent
Lou et al.

(10) Patent No.: US 12,114,078 B2
(45) Date of Patent: Oct. 8, 2024

(54) LOW-LIGHT AUTOFOCUS TECHNIQUE

(71) Applicant: Google LLC, Mountain View, CA (US)

(72) Inventors: Ying Chen Lou, Mountain View, CA (US); Leung Chun Chan, Mountain View, CA (US); Kiran Murthy, Mountain View, CA (US); Qiurui He, Mountain View, CA (US); Szepo Robert Hung, Mountain View, CA (US); Sushil Nath, Mountain View, CA (US)

(73) Assignee: Google LLC, Mountain View, CA (US)

( * ) Notice: Subject to any disclaimer, the term of this patent is extended or adjusted under 35 U.S.C. 154(b) by 302 days.

(21) Appl. No.: 17/754,179

(22) PCT Filed: Oct. 11, 2019

(86) PCT No.: PCT/US2019/055847
§ 371 (c)(1),
(2) Date: Mar. 25, 2022

(87) PCT Pub. No.: WO2021/071508
PCT Pub. Date: Apr. 15, 2021

(65) Prior Publication Data
US 2022/0294964 A1     Sep. 15, 2022

(51) Int. Cl.
*H04N 23/73*     (2023.01)
*H04N 23/71*     (2023.01)

(52) U.S. Cl.
CPC ............ *H04N 23/73* (2023.01); *H04N 23/71* (2023.01)

(58) Field of Classification Search
CPC ...... H04N 23/73; H04N 23/71; H04N 23/611; H04N 23/672; H04N 23/673; H04N 25/53;
(Continued)

(56) References Cited

U.S. PATENT DOCUMENTS

| | | | |
|---|---|---|---|
| 9,781,329 B2 | 10/2017 | Ishii | |
| 10,200,632 B2 | 2/2019 | Thumpudi et al. | |

(Continued)

FOREIGN PATENT DOCUMENTS

| | | | |
|---|---|---|---|
| CN | 102103248 A | 6/2011 | |
| CN | 104683693 A | 6/2015 | |

(Continued)

OTHER PUBLICATIONS

PCT International Search Report and Written Opinion, Application No. PCT/US2019/055847, dated Aug. 20, 2020, 16 pages.

(Continued)

*Primary Examiner* — Luong T Nguyen
(74) *Attorney, Agent, or Firm* — McDonnell Boehnen Hulbert & Berghoff LLP

(57) ABSTRACT

The present disclosure relates to a low-light autofocus technique. One example embodiment includes a method. The method includes receiving an indication of a low-light condition for a camera system. The method also includes determining an extended exposure time for a low-light autofocus procedure of the camera system. Further, the method includes capturing, by the camera system, an extended frame for the low-light autofocus procedure. The extended frame is captured by die camera system using the determined extended exposure time. In addition, the method includes determining, based on the captured extended frame, an in-focus lens setting for a lens of the camera system.

29 Claims, 14 Drawing Sheets

(58) Field of Classification Search
CPC ........ G02B 7/343; G02B 13/001; G02B 7/36; G02B 7/28
See application file for complete search history.

(56) References Cited

U.S. PATENT DOCUMENTS

| | | | |
|---|---|---|---|
| 2016/0127628 A1* | 5/2016 | Chan ..................... | H04N 23/73 348/222.1 |
| 2017/0052613 A1* | 2/2017 | Alameh ................... | G06F 3/165 |
| 2017/0070677 A1* | 3/2017 | Nilsson ................ | H04N 23/689 |
| 2018/0234604 A1 | 8/2018 | Ramsay | |
| 2018/0342050 A1* | 11/2018 | Fitzgerald ............. | G06T 7/0002 |
| 2019/0289201 A1* | 9/2019 | Nishimura ........... | H04N 13/239 |
| 2019/0335092 A1* | 10/2019 | Buxton ................ | H04N 23/611 |
| 2021/0203841 A1* | 7/2021 | Miyatani ................. | G02B 7/36 |

FOREIGN PATENT DOCUMENTS

| | | |
|---|---|---|
| CN | 106797435 A | 5/2017 |
| WO | 2018/178621 A1 | 10/2018 |

OTHER PUBLICATIONS

Barron, Jonathan T., and Yun-Ta Tsai. "Fast fourier color constancy." In Proceedings of the IEEE conference on computer vision and pattern recognition.

* cited by examiner

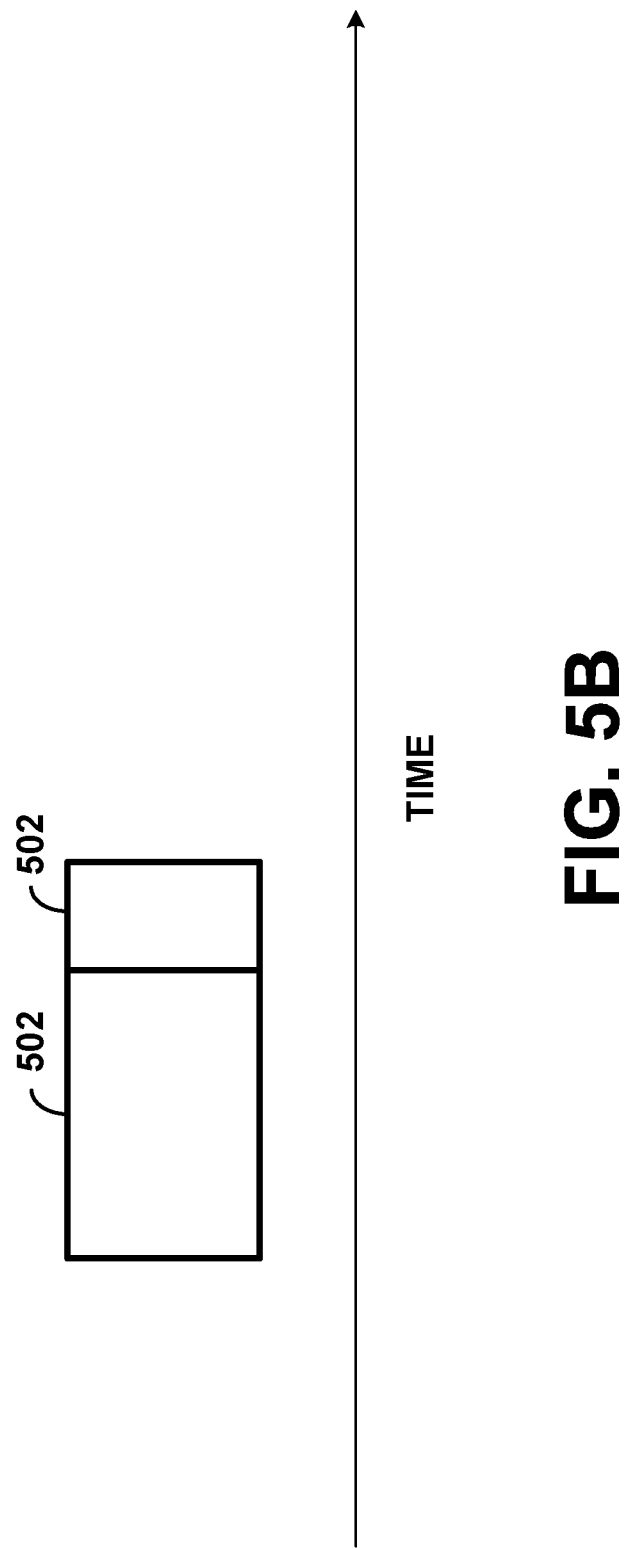

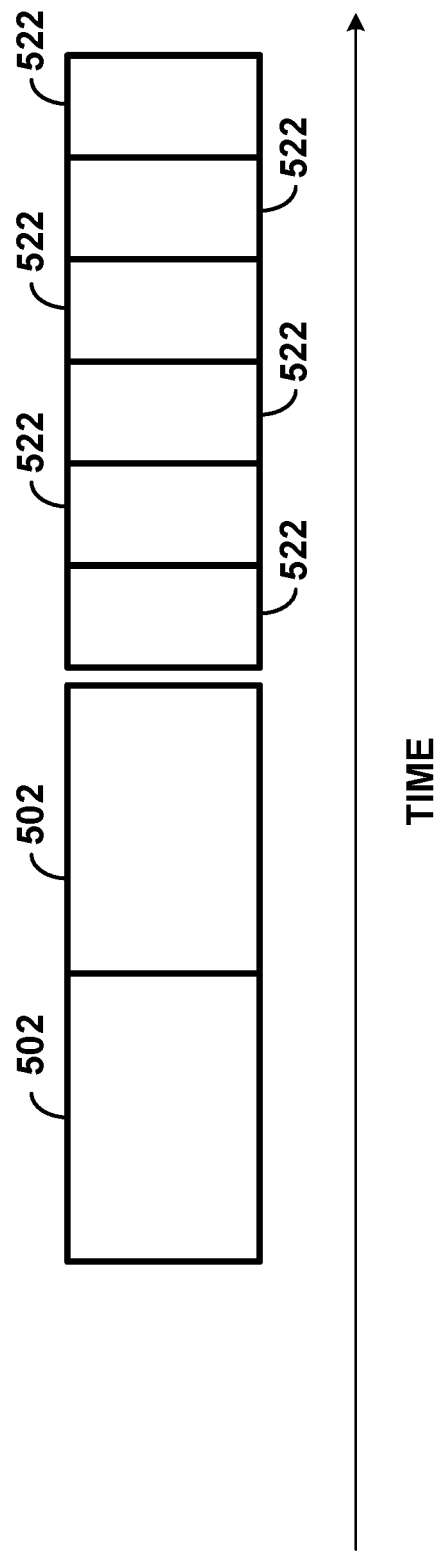

LOW-LIGHT AUTOFOCUS TECHNIQUE

CROSS-REFERENCE TO RELATED APPLICATIONS

The present application is a national stage entry of PCT/US2019/055847 filed Oct. 11, 2019, the contents of which are hereby incorporated by reference.

BACKGROUND

Unless otherwise indicated herein, the materials described in this section are not prior art to the claims in this application and are not admitted to be prior art by inclusion in this section.

Cameras are devices used to capture images of a scene. Some cameras (e.g., film cameras) chemically capture an image on film. Other cameras (e.g., digital cameras) electrically capture image data (e.g., using a charge-coupled device (CCD) or complementary metal-oxide-semiconductor (CMOS) sensors). In order to most accurately capture the scene, a camera may be focused on one or more subjects in the scene. There are multiple ways to focus a camera. For example, a lens of the camera can be moved relative to an image sensor of the camera to adjust the focus of the camera (e.g., to bring one or more subjects in focus). Similarly, an image sensor of the camera can be moved relative to the lens of the camera to adjust the focus of the camera.

Adjusting the focus of a camera can be performed manually (e.g., by a photographer). Alternatively, an autofocus procedure can be performed to adjust the focus of a camera prior to capturing an image (e.g., a payload image). Autofocus procedures may use one or more images (either captured by the primary image sensor of the camera or one or more auxiliary sensors in the camera) to determine an appropriate focus setting for the camera. Then, based on the determined focus setting, the camera adjusts to meet that focus setting. For example, a motor may adjust the relative position of the lens and/or the image sensor to meet the determined focus setting.

There are two traditional types of autofocus procedures, active autofocus procedures and passive autofocus procedures.

In active autofocus procedures, a rangefinder (e.g., a laser rangefinder, a radar device, or a sonar device) is used to determine a distance to one or more objects within a scene. Then, based on the determined distance, a focus setting is determined and the camera is adjusted to meet the determined focus setting.

There are two primary species of passive autofocus procedures, phase-detection autofocus and contrast-detection autofocus.

In phase-detection autofocus, incoming light from the scene is divided (e.g., by a beamsplitter) such that light from the scene entering one side of the lens of the camera is physically separated on an image sensor (e.g., the primary image sensor of the camera or an auxiliary image sensor) from light from the scene entering the opposite side of the lens. Based on the camera characteristics (e.g., lens size, lens focal length, and lens location relative to the image sensor) and the light intensity distribution across the various locations on the image sensor, a focus setting can be determined. Like with active autofocus procedures, the camera can be adjusted to meet the determined focus setting.

In contrast-detection autofocus, a series of frames are captured by the camera at a corresponding series of different focus settings. The contrast between high intensity and low intensity is then determined for each of the captured frames. Based on the determined contrasts, a focus setting is determined (e.g., based on the frame with the highest contrast and/or based on a regression analysis using the contrasts of the captured frames). Similar to the active autofocus procedures and phase-detection autofocus, the camera can be adjusted to meet the determined focus setting.

Unlike active autofocus procedures, passive autofocus procedures (e.g., phase-detection autofocus and contrast-detection autofocus) do not use additional rangefinding equipment. Hence, passive autofocus procedures may be employed in camera systems to save on cost (e.g., in a mobile phone or a digital single-lens reflex (DSLR) camera). However, passive autofocus procedures may be less successful in low-light conditions (e.g., because insufficient contrast is generated between frames for use in contrast-detection autofocus or because there are insufficient bright objects within a scene to compare when using phase-detection autofocus).

SUMMARY

The specification and drawings disclose embodiments that relate to low-light autofocus techniques. Performing passive autofocus techniques in low-light conditions has traditionally been challenging. Example embodiments described herein attempt to improve autofocus in low-light conditions by extending the exposure time for autofocus frames. The extended exposure time may be determined by evaluating a maximum amount of motion blur that can be tolerated within a frame that is used for autofocus. Based on the amount of motion blur that can be tolerated, an exposure time can be determined. Then, one or more frames can be captured using the determined exposure time and those frames can be used for autofocus. Because these frames may have longer exposure times than traditional frames, the resulting autofocus may be enhanced. Further, this enhancement does not use additional optics or sensors (unlike active autofocus techniques).

In a first aspect, the disclosure describes a method. The method includes receiving an indication of a low-light condition for a camera system. The method also includes determining an extended exposure time for a low-light autofocus procedure of the camera system. In addition, the method includes capturing, by the camera system, an extended frame for the low-light autofocus procedure. The extended frame is captured by the camera system using the determined extended exposure time. Further, the method includes determining, based on the captured extended frame, an in-focus lens setting for a lens of the camera system.

As noted above, an extended frame is a frame captured based upon an extended exposure time. The extended exposure time may be an exposure time that is longer than an exposure time of a traditional frame. For example, the extended exposure time may be longer than the exposure time set for one or more payload images after the low-light autofocus technique is performed. In another example, the extended exposure time may be longer than the exposure time for capturing a frame for an autofocus procedure under normal light conditions. Normal light conditions may be determined as being above a low-light intensity threshold as described below.

The method may include the following optional features. Determining an extended exposure time for a low-light autofocus procedure of the camera system may be based on a motion-blur tolerance and the low-light condition. The method may further include adjusting the lens based on the determined in-focus lens setting. The method may further include determining a confidence level for the in-focus lens setting; performing a comparison of the confidence level to a confidence threshold; and adjusting the lens based on the comparison. Adjusting the lens based on the comparison may include adjusting the lens to match the in-focus lens setting in response to the confidence level being greater than or equal to the confidence threshold. Adjusting the lens based on the comparison may include adjusting the lens to a default lens setting in response to the confidence level being less than the confidence threshold. The default lens setting may provide a maximum focal length for the lens. The default lens setting may provide a focal length for the lens that corresponds to a hyperfocal distance of the camera system. The method may further include capturing, by the camera system, a plurality of extended frames for the low-light autofocus procedure, wherein determining the in-focus lens setting for the lens of the camera system is based upon the plurality of captured extended frames. The method may further include capturing, by the camera system using the adjusted lens, a second extended frame for the low-light autofocus procedure; and determining, a second in-focus lens setting for the lens of the camera system based upon the second extended frame. The method may further include adjusting the lens based upon at least one of the following: the second in-focus lens setting, a confidence level associated with the second in-focus lens setting and a confidence level associated with the in-focus lens setting determined prior to the second in-focus lens setting. At least one of the extended frames may be captured by the camera system using an exposure time different than the determined extended exposure time. The method may further include capturing, by the camera system, a plurality of additional frames; wherein each of the additional frames is captured by the camera system using a secondary exposure time, and wherein the secondary exposure time is shorter than the determined extended exposure time; aligning the additional frames such that similar objects in the additional frames are in similar pixel locations within each of the additional frames; and forming a composite image based on the additional frames. The method may further include enhancing the composite image using a fast Fourier color constancy algorithm; determining an optimized tone mapping for the composite image; and modifying the composite image according to the optimized tone mapping. The method may further include detecting the low-light condition for the camera system. Detecting the low-light condition for the camera system may include comparing an ambient light intensity to a threshold low-light intensity. The threshold low-light intensity may be 1.0 lux. The method may further include adjusting the lens to a pre-autofocus setting, wherein the pre-autofocus setting includes a middle focal position for the lens. The camera system may be a component of a mobile device. The method may further include receiving, via a user interface of the mobile device, an indication that a still image or video image is to be captured using the mobile device. The method may further include displaying, on the user interface of the mobile device, an indication to a user to hold the mobile device still. Determining the extended exposure time may include: determining the extended exposure time based on a total time over which the autofocus procedure is to be performed and a number of frames to be captured during the autofocus procedure. The camera system may be part of a mobile device or a digital single-lens reflex (DSLR) camera, and the total time may be based on a mode of operation of the camera system. Determining, based on the captured extended frame, the in-focus lens setting for the lens of the camera system may include applying a phase-detection autofocus algorithm. The method may further include capturing a plurality of frames, wherein the plurality of captured frames includes a first-captured frame and one or more subsequently captured frames captured after the first-captured frame; performing facial recognition on the first-captured frame to identify a region of interest in the first-captured frame and identifying corresponding regions of interest in the one or more subsequently captured frames, wherein applying the phase-detection autofocus algorithm includes using the phase-detection autofocus algorithm to determine the in-focus lens setting based on the corresponding regions of interest in the subsequently captured frames. Determining the extended exposure time may further include determining the extended exposure time based on a tunable duration that represents an acceptable amount of time to dedicate to the autofocus procedure. The method may further include capturing, by the camera system and prior to determining the extended exposure time, a plurality of preview frames, wherein the motion-blur tolerance is based on a center-weighted average of motion across the plurality of preview frames. The method may further include determining the motion-blur tolerance based on a phase-detection autofocus algorithm.

In a second aspect, the disclosure describes a non-transitory, computer-readable medium having instructions stored therein. The instructions, when executed by a processor, perform a method. The method includes receiving an indication of a low-light condition for a camera system. The method also includes determining an extended exposure time for a low-light autofocus procedure of the camera system. In addition, the method includes causing the camera system to capture an extended frame for the low-light autofocus procedure. The extended frame is captured by the camera system using the determined extended exposure time. Further, the method includes determining, based on the captured extended frame, an in-focus lens setting for a lens of the camera system.

In a third aspect, the disclosure describes a mobile device. The mobile device includes a camera system. The camera system includes an image sensor. The camera system also includes a lens configured to modify light from an environment surrounding the mobile device prior to the light being detected by the image sensor. Further, the mobile device includes a controller. The controller is configured to receive an indication of a low-light condition for the camera system. The controller is also configured to determine an extended exposure time for a low-light autofocus procedure of the camera system. In addition, the controller is configured to cause the camera system to capture an extended frame for the low-light autofocus procedure. The extended frame is captured by the camera system using the determined extended exposure time. Further, the controller is configured to determine, based on the plurality of captured frames, an in-focus lens setting for the lens.

In an additional aspect, the disclosure describes a system. The system includes a means for receiving a low-light condition for a camera system. The system also includes a means for determining an extended exposure time for a low-light autofocus procedure of the camera system. Additionally, the system includes a means for capturing, by the camera system, an extended frame for the low-light autofocus procedure. The extended frame is captured by the camera system using the determined extended exposure time. Further, the system includes a means-for determining, based on the captured extended frame, an in-focus lens setting for a lens of the camera system.

It will be appreciated that features described above in the context of one aspect may be combined with features described in the context of another aspect.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 5B is an illustration of a frame-capture timeline, according to example embodiments.

FIG. 5C is an illustration of a frame-capture timeline, according to example embodiments.

DETAILED DESCRIPTION

Figure 1:
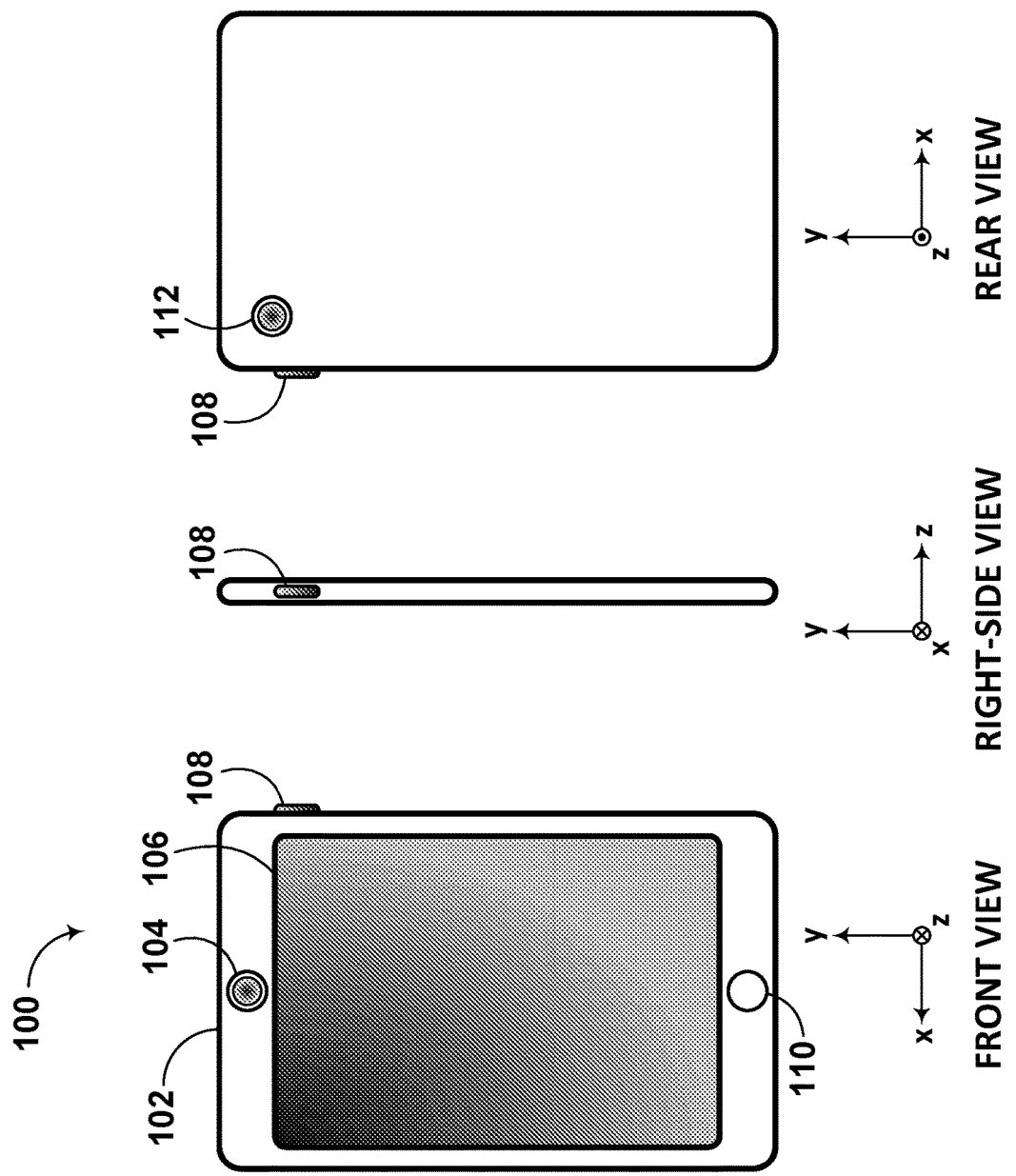
FIG. 1 is an illustration of front, right-side, and rear views of a digital camera device, according to example embodiments.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. In addition, some of the illustrated elements may be combined or omitted. Similarly, an example embodiment may include elements that are not illustrated in the figures.

Depending on context, a "camera" may refer to an individual image capture component, or a device that contains one or more image capture components. In general, image capture components may include an aperture, lens, recording surface, and shutter, as described below.

The terms "image" and "payload image" may be used herein to describe the ultimate image of the scene that is recorded and can be later viewed by the user of the camera. The term "frame," on the other hand, may be used herein to represent temporarily stored depictions of scenes that are displayed for preview purposes or are captured and analyzed to determine one or more qualities of a scene prior to capturing a payload image (e.g., to determine what types of subjects are in a given scene, regions of interest within a given scene, appropriate exposure times, ambient light intensity, motion-blur tolerance, etc.).

I. OVERVIEW

Example embodiments relate to low-light autofocus techniques. For example, some embodiments relate to a method for performing autofocus in low-light conditions. As described above, performing autofocus in low-light has traditionally been difficult. Embodiments described herein seek to improve performance of autofocus in low-light conditions to enhance images captured in low-light conditions.

One example method may be performed using a camera system (e.g., a camera system that is a component of a mobile device, such as a mobile phone, or a DSLR camera). The method may be initiated when it is determined that a low-light condition is present. Such a determination may be based on, for example, one or more preview frames captured by the camera system (e.g., and displayed on a display of a mobile device), one or more frames previously captured by the camera system, a measurement from an auxiliary ambient light sensor (e.g., by comparing the ambient light intensity to an intensity threshold), or a selection by a user of the camera system.

After identifying the low-light condition, an exposure time may be determined for the low-light autofocus procedure. The exposure time may be based on a variety of factors. For example, the exposure time may be based on the low-light condition itself (e.g., the ambient light intensity), a motion-blur tolerance (e.g., which itself may be based on the subjects within the scene that is ultimately to be photographed and/or whether the camera system is in a handheld mode or a mounted mode), and/or a maximum amount of time a user is willing to wait for the low-light autofocus procedure to be performed. The motion-blur tolerance for performing autofocus may be considerably higher than a motion-blur tolerance for capturing payload images that are ultimately to be viewed by humans. In other words, objects may appear overly and undesirably blurry in a frame that is acceptable for performing autofocus. Because the motion-blur tolerance may be higher for autofocus techniques, the determined exposure time for use in the autofocus technique may be longer than the exposure time used to capture traditional images. By selecting a longer exposure time, additional light can be gathered by the image sensor through the lens of the camera system. This additional light can improve the quality of the resulting autofocus algorithm applied to the captured frame. For example, phase-detection autofocus can have improved results when using an increased exposure time.

After determining the exposure time, a plurality of frames may be captured by the camera system. At least one frame of the plurality of captured frames may be captured using the determined exposure time. The captured frames may be used (e.g., by a computing device associated with the camera system) to determine an in-focus lens setting for the camera system. For example, the in-focus lens setting may include the location of a lens relative to an image sensor such that the subjects in the scene are in focus in payload images. In addition to determining the in-focus lens setting, a confidence level for that in-focus lens setting may be determined. The confidence level may be determined based on the autofocus algorithm being employed. For example, if a phase-detection autofocus algorithm is being used to determine an in-focus lens setting based on the plurality of captured frames, the phase-detection autofocus algorithm may output a confidence level based on the plurality of captured frames, the subjects in the scene within the captured frames, the determined exposure time, the number of captured frames, and/or the light intensity within the captured frames.

Based on the in-focus lens setting and the confidence level, the camera system may be adjusted. For example, the confidence level may be compared to a confidence threshold. If the confidence level meets or exceeds the confidence threshold, the camera system may adjust to satisfy the determined in-focus lens setting (e.g., the lens may be moved relative to the image sensor such that the lens is in the determined in-focus position). If the confidence level does not meet or exceed the confidence threshold, though, the camera system may adjust to satisfy a default focus setting. For example, the lens may be moved relative to the image sensor such that the lens is at a midpoint of all possible lens positions, such that the lens has a maximum focal length, or such that the lens corresponds to a hyperfocal distance of the camera system.

The autofocus techniques described herein can be used in low-light conditions, as described above. As such, the autofocus techniques described herein may be used outdoors at night or in dimly lit rooms. In some embodiments, the autofocus techniques can be used in extreme low-light conditions, for example, as may occur in astrophotography.

II. EXAMPLE SYSTEMS

The following description and accompanying drawings will elucidate features of various example embodiments. The embodiments provided are by way of example, and are not intended to be limiting. As such, the dimensions of the drawings are not necessarily to scale.

As image capture devices, such as cameras, become more popular, they may be employed as standalone hardware devices or integrated into various other types of devices. For instance, still and video cameras are now regularly included in wireless computing devices (e.g., mobile devices, such as mobile phones), tablet computers, laptop computers, video game interfaces, home automation devices, and even automobiles and other types of vehicles.

The physical components of a camera may include one or more apertures through which light enters, one or more recording surfaces for capturing the images represented by the light, and lenses positioned in front of each aperture to focus at least part of the image on the recording surface(s). The apertures may be fixed size or adjustable. In an analog camera, the recording surface may be photographic film. In a digital camera, the recording surface may include an electronic image sensor (e.g., a charge coupled device (CCD) or a complementary metal-oxide-semiconductor (CMOS) sensor) to transfer and/or store captured images in a data storage unit (e.g., memory).

One or more shutters may be coupled to or nearby the lenses or the recording surfaces. Each shutter may either be in a closed position, in which it blocks light from reaching the recording surface, or an open position, in which light is allowed to reach to recording surface. The position of each shutter may be controlled by a shutter button. For instance, a shutter may be in the closed position by default. When the shutter button is triggered (e.g., pressed), the shutter may change from the closed position to the open position for a period of time, known as the shutter cycle. During the shutter cycle, an image may be captured on the recording surface. At the end of the shutter cycle, the shutter may change back to the closed position.

Alternatively, the shuttering process may be electronic. For example, before an electronic shutter of a CCD image sensor is "opened," the sensor may be reset to remove any residual signal in its photodiodes. While the electronic shutter remains open, the photodiodes may accumulate charge. When or after the shutter closes, these charges may be transferred to longer-term data storage. Combinations of mechanical and electronic shuttering may also be possible.

Regardless of type, a shutter may be activated and/or controlled by something other than a shutter button. For instance, the shutter may be activated by a softkey, a timer, or some other trigger. Herein, the term "image capture" may refer to any mechanical and/or electronic shuttering process that results in one or more images being recorded, regardless of how the shuttering process is triggered or controlled.

The exposure of a captured image may be determined by a combination of the size of the aperture, the brightness of the light entering the aperture, and the length of the shutter cycle (also referred to as the shutter length, the exposure length, or the exposure time). Additionally, a digital and/or analog gain (e.g., based on an ISO setting) may be applied to the image, thereby influencing the exposure. In some embodiments, the term "exposure length," "exposure time," or "exposure time interval" may refer to the shutter length multiplied by the gain for a particular aperture size. Thus, these terms may be used somewhat interchangeably, and should be interpreted as possibly being a shutter length, an exposure time, and/or any other metric that controls the amount of signal response that results from light reaching the recording surface.

In some implementations or modes of operation, a camera may capture one or more still images each time image capture is triggered. In other implementations or modes of operation, a camera may capture a video image by continuously capturing images at a particular rate (e.g., 24 frames per second) as long as image capture remains triggered (e.g., while the shutter button is held down). Some cameras, when operating in a mode to capture a still image, may open the shutter when the camera device or application is activated, and the shutter may remain in this position until the camera device or application is deactivated. While the shutter is open, the camera device or application may capture and display a representation of a scene on a viewfinder (sometimes referred to as displaying a "preview frame"). When image capture is triggered, one or more distinct payload images of the current scene may be captured.

Cameras, including digital and analog cameras, may include software to control one or more camera functions and/or settings, such as aperture size, exposure time, gain, and so on. Additionally, some cameras may include software that digitally processes images during or after image capture. While the description above refers to cameras in general, it may be particularly relevant to digital cameras.

As noted previously, digital cameras may be standalone devices (e.g., a DSLR camera) or integrated with other devices. As an example, FIG. 1 illustrates the form factor of a digital camera device 100. Digital camera device 100 may be, for example, a mobile device (e.g., a mobile phone), a tablet computer, or a wearable computing device. However, other embodiments are possible. Digital camera device 100 may include various elements, such as a body 102, a front-facing camera 104, a multi-element display 106, a shutter button 108, and other buttons 110. Digital camera device 100 could further include a rear-facing camera 112. Front-facing camera 104 may be positioned on a side of body 102 typically facing a user while in operation, or on the same side as multi-element display 106. Rear-facing camera 112 may be positioned on a side of body 102 opposite front-facing camera 104. Referring to the cameras as front-facing and rear-facing is arbitrary, and digital camera device 100 may include multiple cameras positioned on various sides of body 102.

Multi-element display 106 could represent a cathode ray tube (CRT) display, a light-emitting diode (LED) display, a liquid crystal display (LCD), a plasma display, or any other type of display known in the art. In some embodiments, multi-element display 106 may display a digital representation of the current image being captured by front-facing camera 104 and/or rear-facing camera 112, or an image that could be captured or was recently captured by either or both of these cameras. Tus, multi-element display 106 may serve as a viewfinder for either camera. Multi-element display 106 may also support touchscreen and/or presence-sensitive functions that may be able to adjust the settings and/or configuration of any aspect of digital camera device 100.

Front-facing camera 104 may include an image sensor and associated optical elements such as lenses. Front-facing camera 104 may offer zoom capabilities or could have a fixed focal length. In other embodiments, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent a monoscopic, stereoscopic, or multiscopic camera. Rear-facing camera 112 may be similarly or differently arranged. Additionally, front-facing camera 104, rear-facing camera 112, or both, may be an array of one or more cameras.

Either or both of front facing camera 104 and rear-facing camera 112 may include or be associated with an illumination component that provides a light field to illuminate a target object. For instance, an illumination component could provide flash or constant illumination of the target object (e.g., using one or more LEDs). An illumination component could also be configured to provide a light field that includes one or more of structured light, polarized light, and light with specific spectral content. Other types of light fields known and used to recover three-dimensional (3D) models from an object are possible within the context of the embodiments herein.

Either or both of front facing camera 104 and rear-facing camera 112 may include or be associated with an ambient light sensor that may continuously or from time to time determine the ambient brightness of a scene that the camera can capture. In some devices, the ambient light sensor can be used to adjust the display brightness of a screen associated with the camera (e.g., a viewfinder). When the determined ambient brightness is high, the brightness level of the screen may be increased to make the screen easier to view. When the determined ambient brightness is low, the brightness level of the screen may be decreased, also to make the screen easier to view as well as to potentially save power. Additionally, the ambient light sensor's input may be used to determine an exposure time of an associated camera, or to help in this determination.

Digital camera device 100 could be configured to use multi-element display 106 and either front-facing camera 104 or rear-facing camera 112 to capture images of a target object (i.e., a subject within a scene). The captured images could be a plurality of still images or a video image (e.g., a series of still images captured in rapid succession with or without accompanying audio captured by a microphone). The image capture could be triggered by activating shutter button 108, pressing a softkey on multi-element display 106, or by some other mechanism. Depending upon the implementation, the images could be captured automatically at a specific time interval, for example, upon pressing shutter button 108, upon appropriate lighting conditions of the target object, upon moving digital camera device 100 a predetermined distance, or according to a predetermined capture schedule.

As noted above, the functions of digital camera device 100 (or another type of digital camera) may be integrated into a computing device, such as a wireless computing device, cell phone, tablet computer, laptop computer, and so on. For example, a camera controller may be integrated with the digital camera device 100 to control one or more functions of the digital camera device 100. For purposes of example, FIG. 2 is a simplified block diagram showing some of the components of an example computing device 200 that may include camera components 224.

By way of example and without limitation, computing device 200 may be a cellular mobile telephone (e.g., a smartphone), a still camera, a video camera, a fax machine, a computer (such as a desktop, notebook, tablet, or handheld computer), a personal digital assistant (PDA), a home automation component, a digital video recorder (DVR), a digital television, a remote control, a wearable computing device, or some other type of device equipped with at least some image capture and/or image processing capabilities. It should be understood that computing device 200 may represent a physical camera device such as a digital camera, a particular physical hardware platform on which a camera application operates in software, or other combinations of hardware and software that are configured to carry out camera functions.

Figure 2:
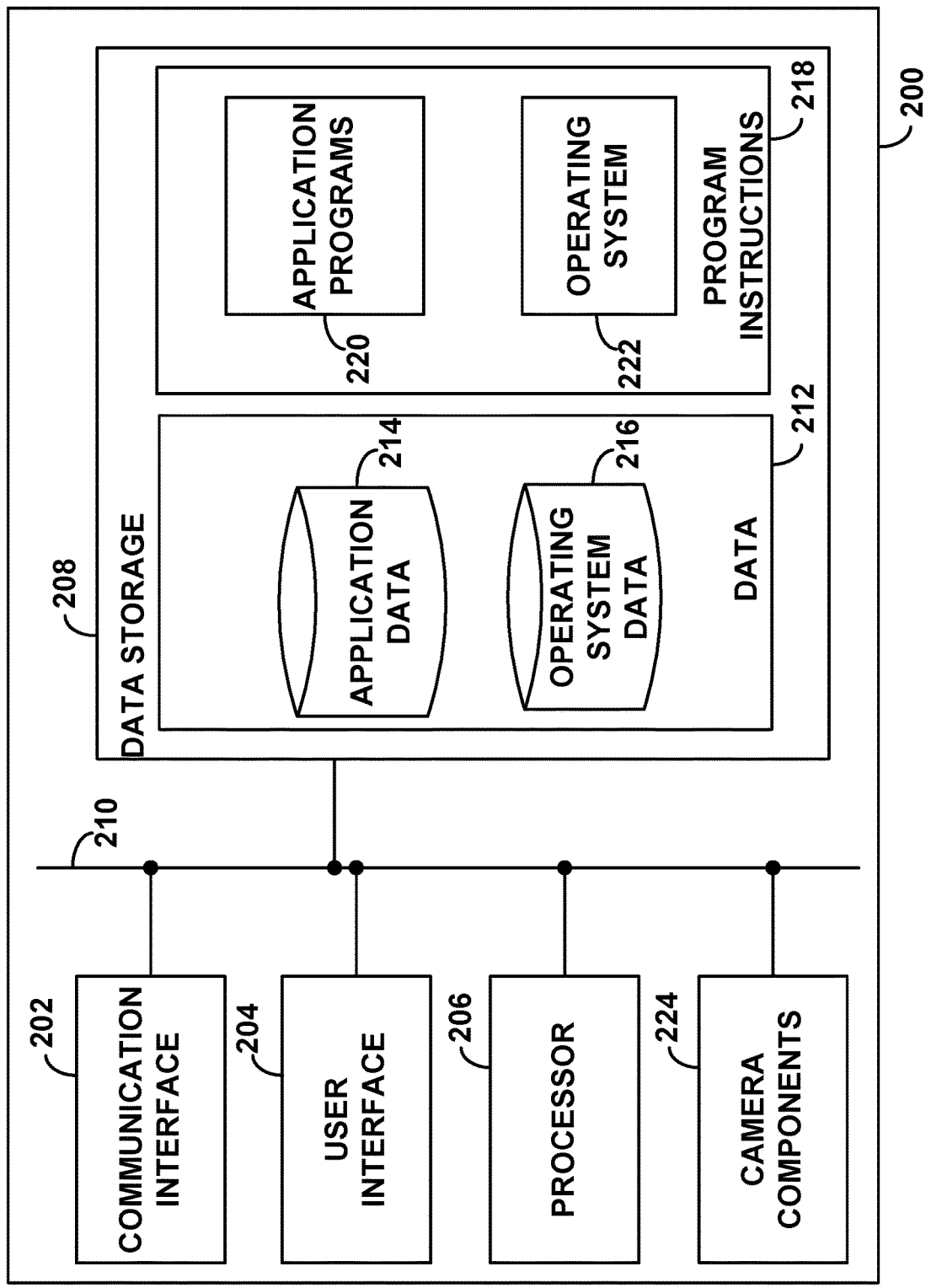
FIG. 2 is an illustration of a block diagram of a computer device with image capture capability, according to example embodiments.

As shown in FIG. 2, computing device 200 may include a communication interface 202, a user interface 204, a processor 206, data storage 208, and camera components 224, all of which may be communicatively linked together by a system bus, network, or other connection mechanism 210.

Communication interface 202 may allow computing device 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port. Communication interface 202 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 202. Furthermore, communication interface 202 may include multiple physical communication interfaces (e.g., a Wifi interface, a BLUETOOTH® interface, and a wide-area wireless interface).

User interface 204 may function to allow computing device 200 to interact with a human or non-human user, such as to receive input from a user and to provide output to the user. Thus, user interface 204 may include input components such as a keypad, keyboard, touch-sensitive or presence-sensitive panel, computer mouse, trackball, joystick, microphone, and so on. User interface 204 may also include one or more output components such as a display screen which, for example, may be combined with a presence-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices.

In some embodiments, user interface 204 may include a display that serves as a viewfinder for still camera and/or video camera functions supported by computing device 200. Additionally, user interface 204 may include one or more buttons, switches, knobs, and/or dials that facilitate the configuration and focusing of a camera function and the capturing of images (e.g., capturing a picture). It may be possible that some or all of these buttons, switches, knobs, and/or dials are implemented by way of a presence-sensitive panel.

Processor 206 may include one or more general purpose processors (e.g., microprocessors) and/or one or more special purpose processors (e.g., digital signal processors (DSPs), graphics processing units (GPUs), floating point units (FPUs), network processors, or application-specific integrated circuits (ASICs)). In some instances, special purpose processors may be capable of image processing, image alignment, and merging images, among other possibilities. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory, computer-readable medium, having stored thereon program instructions that, upon execution by the processor 206, cause computing device 200 to carry out any of the methods, processes, or operations disclosed in this specification and/or the accompanying drawings. For example, the program instructions 218, when executed by the processor 206, may perform one or more autofocus techniques described herein. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, and/or gaming applications) installed on computing device 200. Similarly, data 212 may include operating system data 216 and application data 214. Operating system data 216 may be accessible primarily by operating system 222, and application data 214 may be accessible primarily by one or more of application programs 220. Application data 214 may be arranged in a file system that is visible to or hidden from a user of computing device 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on.

It is understood that application programs 220 may sometimes be referred to as "apps" for short. Additionally, application programs 220 may be downloadable to computing device 200 through one or more online application stores or application markets. However, application programs can also be installed on computing device 200 in other ways, such as via a web browser or through a physical interface (e.g., a USB port) on computing device 200.

Camera components 224 may include, but are not limited to, an aperture, shutter, recording surface (e.g., photographic film and/or an image sensor), lens, and/or shutter button. Camera components 224 may be controlled at least in part by software executed by processor 206.

Figure 3A:
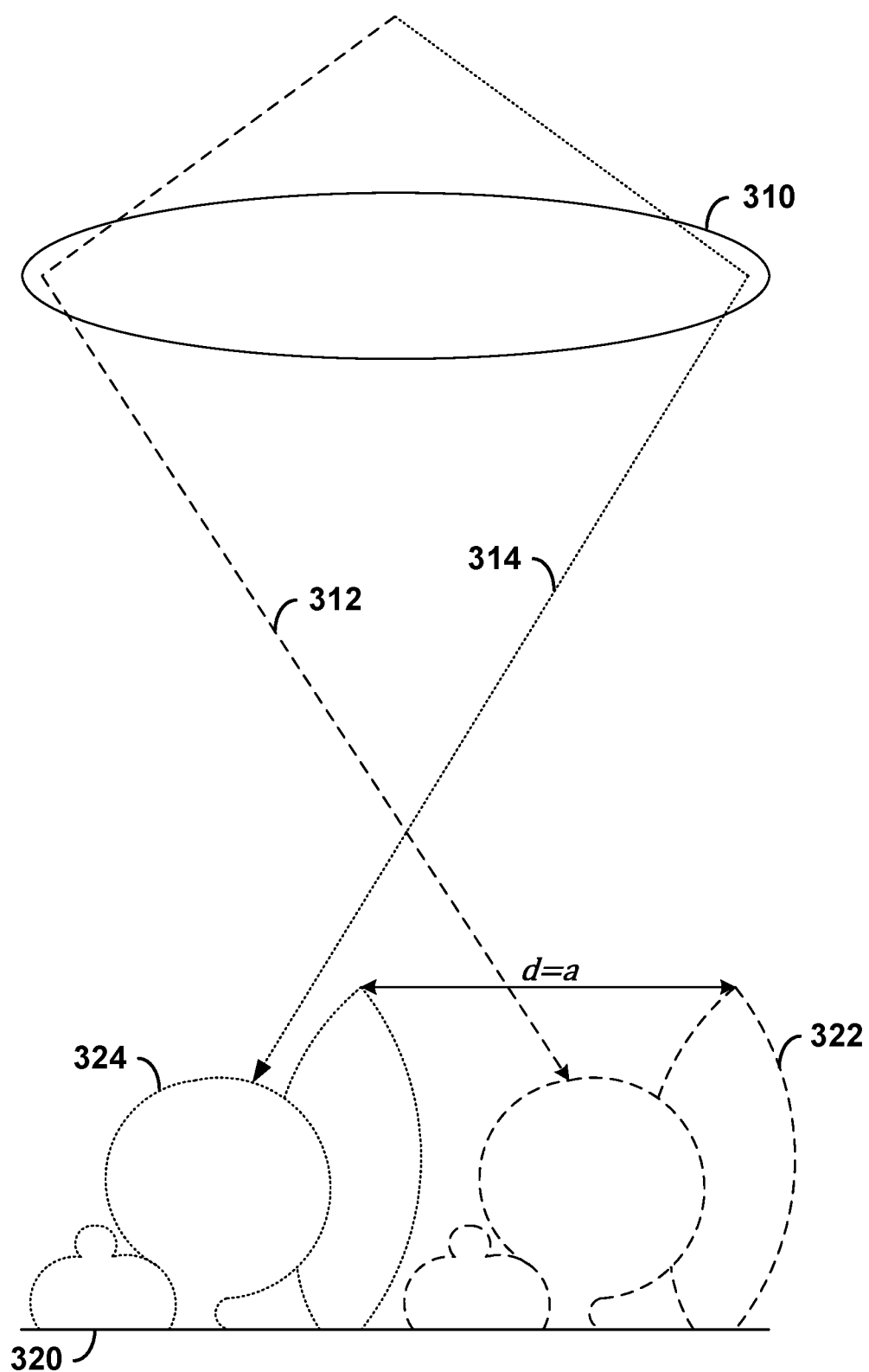
FIG. 3A is an illustration of a phase-detection autofocus technique, according to example embodiments.

FIG. 3A is an illustration of a phase-detection autofocus technique. Phase-detection autofocus is a passive autofocus technique that attempts to determine a proper focus setting of a camera system (e.g., a position of a lens and/or a position of an image sensor) based on the subjects within a scene of a surrounding environment that will ultimately be captured in a payload image. Phase-detection autofocus functions by splitting light that enters the camera system (e.g., via a lens 310, as illustrated in FIG. 3A) into two or more portions. Those portions may are captured and then compared to one another. The two or more portions are compared to determine relative locations of intensity peaks and valleys across the respective frames. If the relative locations within the frame match, the subject(s) of the scene are in focus. If the relative locations do not match, then the subject(s) of the scene are out of focus. Based on the distance between respective peaks and respective valleys and the position of optics within the camera system (e.g., the lens 310, image sensor(s), etc.), adjustments can be determined that would move the subject(s) into focus. This is detailed further below.

In some embodiments, light from the scene that is split for phase-detection autofocus purposes may be split by a prism or a micro-lens array. The two or more frames from the split light may then be directed to two or more different image sensors within the camera system or two or more portions of the same image sensor within the camera system. For example, FIG. 3A illustrates a first light signal 312 that comes from a left portion of the lens 310 and a second light signal 314 that comes from a right portion of the lens 310. As depicted, the first light signal 312 and the second light signal 314 may be directed to different regions of an image sensor 320 of the camera system. The image sensor 320 of FIG. 3A may be the primary image sensor of the camera system (e.g., used to capture payload images) or an auxiliary image sensor (e.g., dedicated for use in phase-detection autofocus).

A first depiction of the scene 322 that corresponds to the first light signal 312 may then be captured by the image sensor 320. Similarly, a second depiction of the scene 324 that corresponds to the second light signal 314 may be captured by the image sensor 320. The first and second depictions of the scene 322, 324 are illustrated as protruding from the surface of the image sensor 320 for illustrative purposes only. It is understood that these depictions would, in reality, correspond to chemical or digital recordings of intensity distributions of the first and second light signals 312, 314 on a surface of the image sensor 320. As illustrated, the first depiction of the scene 322 is separated from the second depiction of the scene 324 on the image sensor 320 (and, thus, correspondingly, within a captured frame) by a distance d. The distance d has a value of a as illustrated in FIG. 3A. Hence, based on the distance d not being equal to 0, it could be determined that the subjects in the scene are out of focus. Further, based on the value a and the configuration of the camera system (e.g., focal length of the lens 310, position of the lens 310 relative to the image sensor 320, etc.), the amount that the subjects in the scene are out of focus and an adjustment (e.g., to the lens 310 position) to bring them in focus can be determined.

In alternate embodiments, rather than being directed to different regions of the image sensor 320, the light signals 312, 314 could be split at the pixel level (e.g., by a micro-lens overlying each pixel of the image sensor 320) and directed to different regions of each pixel (e.g., a left light detector of a pixel and a right light detector of a pixel). In such embodiments, the intensity peaks and valleys could be compared at a pixel-by-pixel level or at a frame level, where two frames are generated, one frame being a composite of all detections from the left light detectors of the pixels and a second frame being a composite of all detections from the right light detectors of the pixels. In other embodiments, rather than being directed to different regions of the image sensor 320, the light signals 312, 314 could be split and directed to different image sensors entirely (e.g., one image sensor that captures a frame based on the first light signal 312 and one image sensor that captures a frame based on the second light signal 314). A frame captured by the image sensor corresponding to the first light signal 312 could then be compared to a frame captured by the image sensor corresponding to the second light signal 314.

Further, in some embodiments, one or more objects in the scene may be in focus while others remain out of focus. Hence, determining whether the scene is out of focus may include selecting one or more subjects in the scene upon which to make the determination. A region of interest for focus determination may be selected based on a user (e.g., of a mobile device). For example, the user may select an object in a preview frame that the user desires to be in focus (e.g., a building, a person, the face of a person, a car, etc.). Alternatively, an object-identification algorithm may be employed to determine what type of objects are in a scene and determine which of the objects should be in focus based on a list ranked by importance (e.g., if a human face is in the scene, that should be the object in focus, followed by a dog, followed by a building, etc.). In still other embodiments, whether the scene is in focus or out of focus may include identifying whether an object that is moving within a scene (e.g., as determined by preview frames) is in focus or not. Alternatively, determining an "in focus" camera setting could include determining the lens setting at which a maximized region of the frame (e.g., by pixel area) is in focus or a maximized number of subjects (e.g., one discrete object, two discrete objects, three discrete objects, four discrete objects, etc.) within the frame are in focus.

Figure 3B:
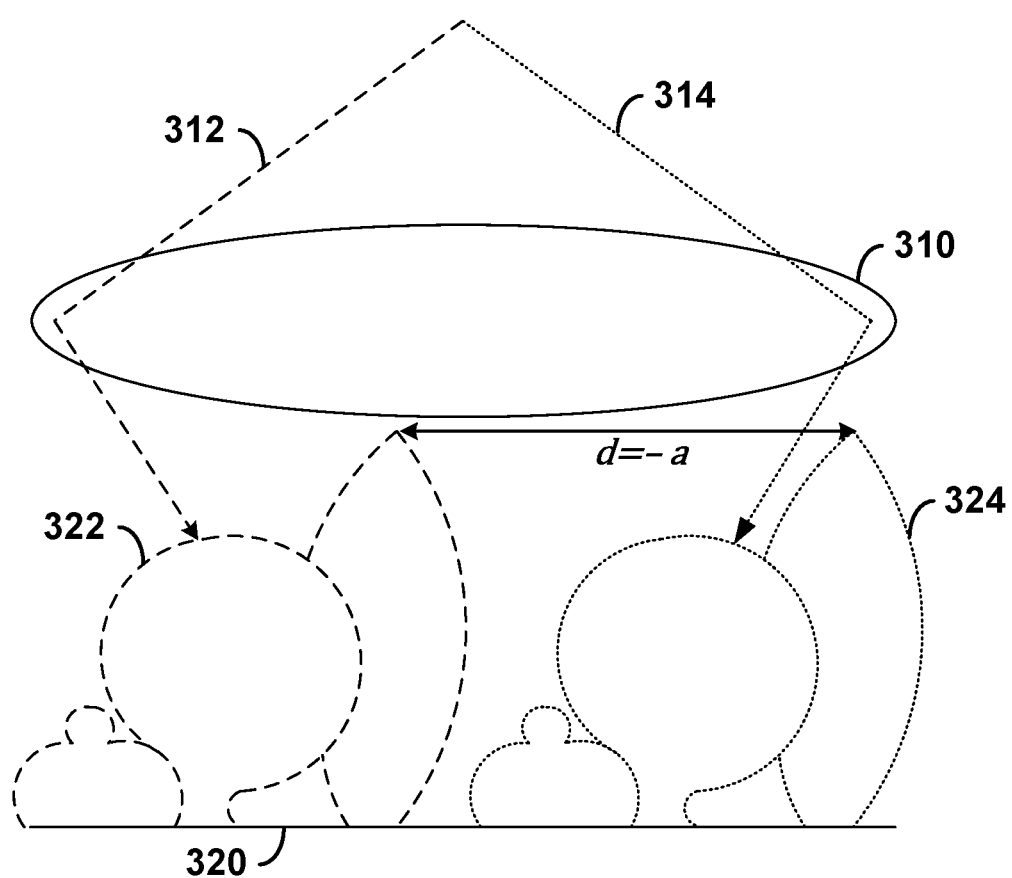
FIG. 3B is an illustration of a phase-detection autofocus technique, according to example embodiments.

Similar to FIG. 3A, FIG. 3B illustrates a phase-detection autofocus technique. Like FIG. 3A, the first light signal 312 and the second light signal 314 are split and imaged by the image sensor 320. The difference between FIG. 3B and FIG. 3A is the separation between the lens 310 and the image sensor 320. In FIG. 3B, the image sensor 320 is positioned closer to the lens 310 than in FIG. 3A. Because the image sensor 320 is closer to the lens 310, the corresponding first and second depictions of the scene 322, 324 have switched sides of the captured frame on the image sensor 320 when compared to FIG. 3A. Like with FIG. 3A, the first and second depictions of the scene 322, 324 are again separated by a distance d. However, in FIG. 3B, d is equal to −a. Again, because d is not equal to 0, the scene may be determined to be out of focus given the current settings of the camera system. Further, based on the value −a and the configuration of the camera system (e.g., focal length of the lens 310, position of the lens 310 relative to the image sensor 320, etc.) the amount that the subjects in the scene are out of focus and an adjustment (e.g., to the lens 310 position) to bring them in focus can be determined.

Figure 3C:
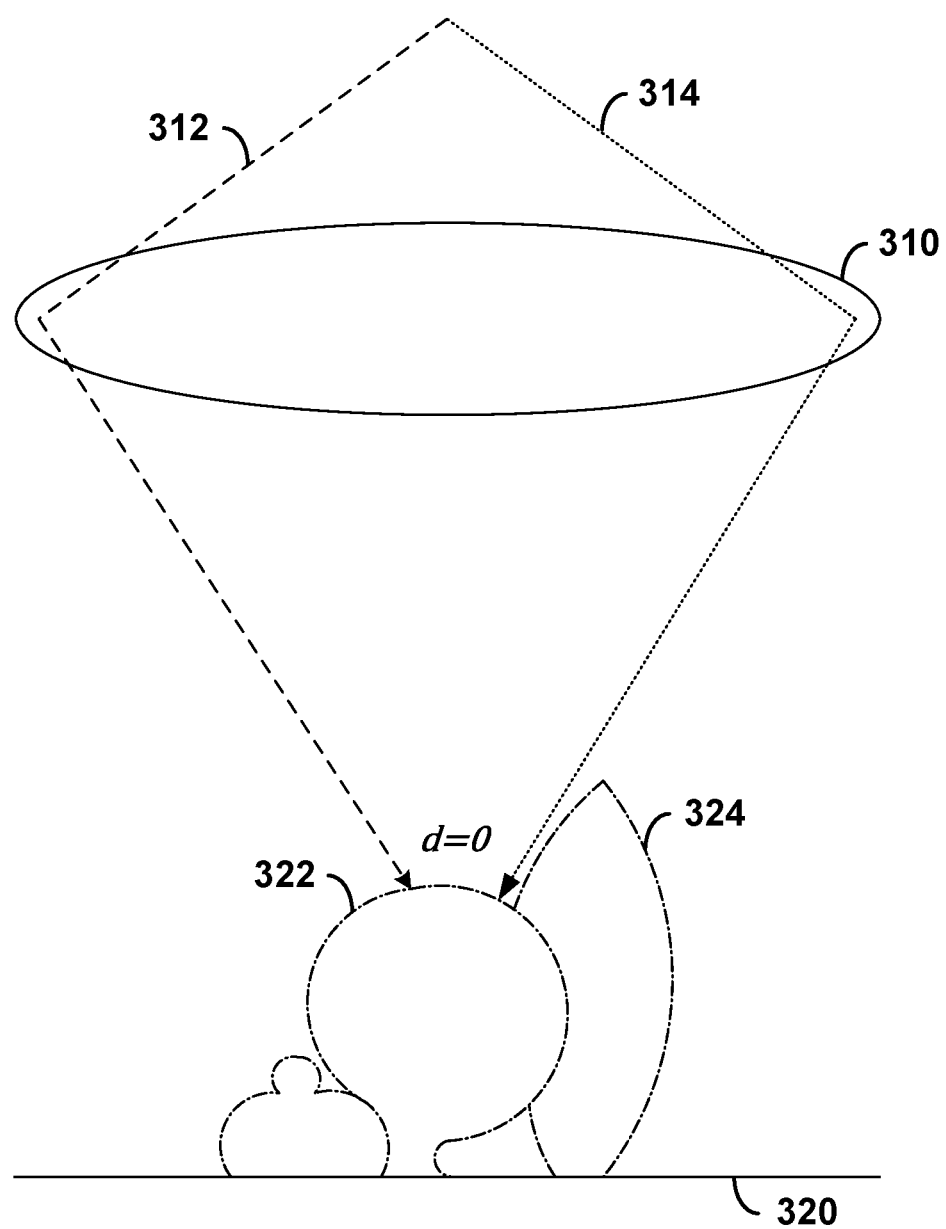
FIG. 3C is an illustration of a phase-detection autofocus technique, according to example embodiments.

Similar to FIGS. 3A and 3B. FIG. 3C illustrates a phase-detection autofocus technique. Like FIGS. 3A and 3B, the first light signal 312 and the second light signal 314 are split and imaged by the image sensor 320. The difference between FIG. 3C and FIGS. 3A and 3B is the separation between the lens 310 and the image sensor 320. In FIG. 3C, the image sensor 320 is positioned closer to the lens 310 than in FIG. 3A but farther from the lens 310 than in FIG. 3B. Because of the position of the image sensor 320, the corresponding first and second depictions of the scene 322, 324 now coincide with one another (i.e., overlap) in the captured frame on the image sensor 320. Unlike in FIGS. 3A and 3B, the distance d between the first and second depictions of the scene 322, 324 is equal to 0. Because d is equal to 0, the scene may be determined to be in focus given the current settings of the camera system. Hence, the camera system may be sufficiently in focus to capture a payload image of the scene.

Figure 3D:
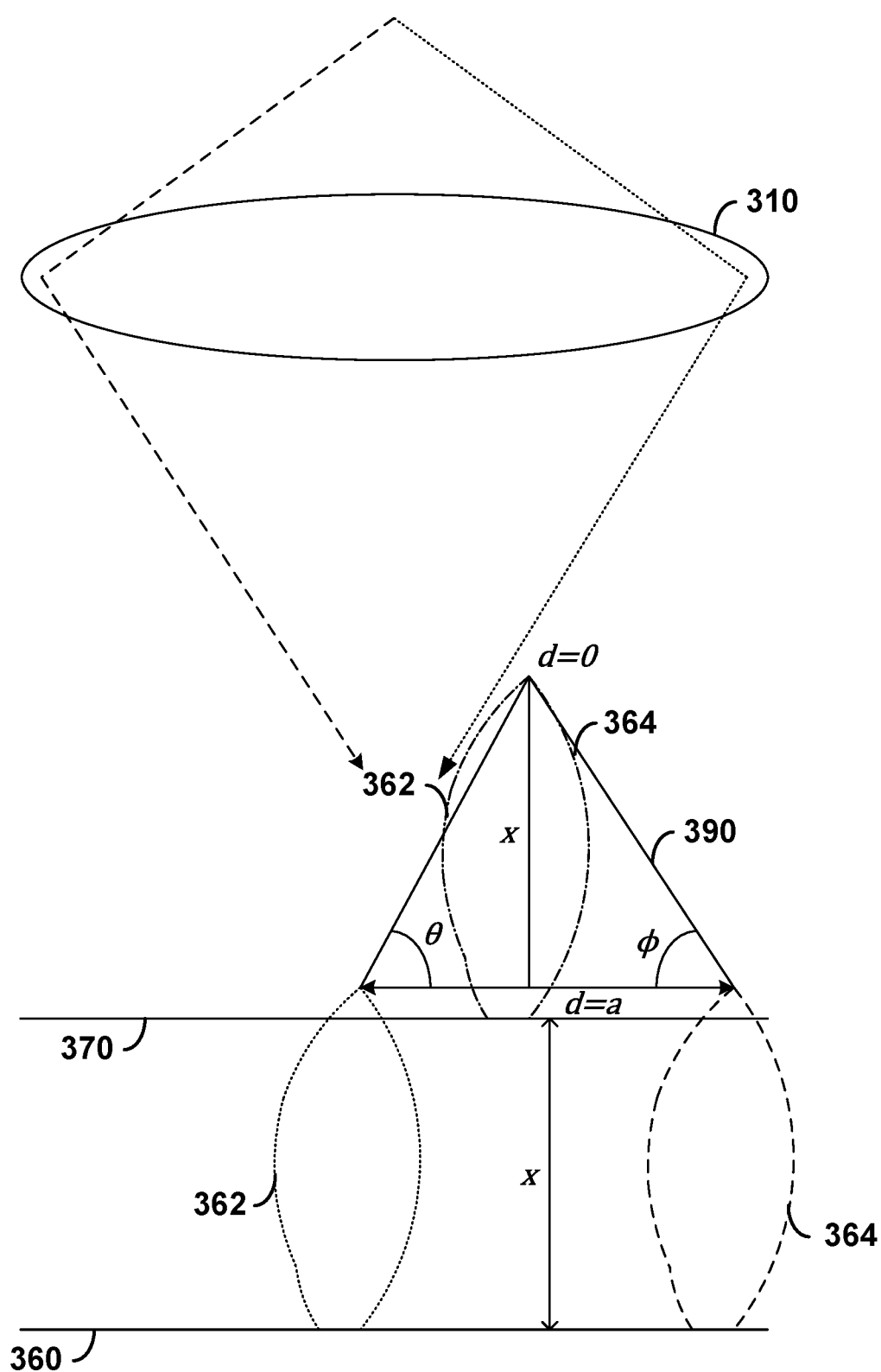
FIG. 3D is an illustration of a phase-detection autofocus technique, according to example embodiments.

FIG. 3D uses two potential frames captured by image sensors at different locations to illustrate a phase-detection autofocus technique. The first phase-detection frame is illustrated as captured by the image sensor at a first location 360. Further, the first phase-detection frame includes a first instance 362 of a subject and a second instance 364 of the same subject based on the separated light signals (similar to the first depiction of the scene 322 and the second depiction of the scene 324 illustrated and described with respect to FIG. 3A). As illustrated, the first instance 362 and the second instance 364 are separated in the frame by a distance of d=a (similar to FIG. 3A). If, instead, the frame had been captured at a second location 370 of the image sensor, which is a distance x closer to the lens 310 than the first location 360, the first instance 362 and the second instance 364 of the subject may overlap (i.e. d would be equal to 0). Hence, if a frame is captured at the first location 360, the goal would be to ascertain the distance x based on the first frame, such that the lens 310 can move relative to the image sensor by a distance x to put the subjects of the scene in focus in order to prepare to capture a payload image.

Based on the location of the lens 310, the characteristics of the lens 310 (e.g., focal length), the location of the image sensor, and/or other qualities of the camera system, properties of the triangle 390 illustrated in FIG. 3D are known. For example, the angles θ and φ may be known based on the camera system. Also, the distance d(d=a in FIG. 3D) can be determined based on the frame captured at the first location 360. Using the distance d and the angles θ and φ, the distance x can be determined trigonometrically. Thus, based on the captured frame and the geometry of the optics within the camera system, an adjustment that could be made (e.g., by moving the lens 310 and/or the image sensor using a motorized stage) to bring subject(s) of the scene into focus could be determined.

As demonstrated above, a single frame can be used to determine the amount a scene is out of focus using a phase-detection autofocus algorithm. In alternate embodiments, however, multiple frames may be captured. After each frame is captured, a calculation may be made based on the captured frame to determine the proper lens setting to bring the subject(s) of the surrounding scene in focus. The first frame capture/calculation may be coarse with each additional frame capture/calculation being slightly more refined until a sufficient in-focus setting has been achieved (e.g., each additional frame capture/calculation may provide convergence toward the actual focus value).

While the technique described above is adequate for performing autofocus in many applications, there is a threshold amount of light that should be captured in the frame used to perform the phase-detect autofocus. This may be challenging in low-light situations (e.g., outdoors at night or in a darkly lit room). As such, techniques described herein can be used to enhance the amount of light that is used for phase-detection autofocus.

Figure 4:
FIG. 4 is an illustration of a low-light condition in a preview frame, according to example embodiments.

FIG. 4 is an illustration of a low-light condition in a preview frame 402, according to example embodiments. The preview frame 402 may display a captured frame to a user based on the current scene being captured using the current camera system settings (e.g., aperture settings, exposure settings, etc.). The techniques described herein may be used when a preview frame appears similar to the preview frame 402 of FIG. 4. For example, if a payload image is to be captured (e.g., as determined by a user pressing a shutter button such as a physical shutter button on a DSLR or a shutter button on the user interface (UI) of a mobile device), an ambient light intensity may be determined (e.g., based on a preview frame, the ambient light intensity incident upon the image sensor, or the ambient light intensity incident on an auxiliary sensor). This ambient light intensity may be compared to a threshold low-light intensity to determine if a low-light condition is present. The threshold low-light intensity could be 3.0 lux, 2.5 lux, 2.0 lux, 1.5 lux, 1.0 lux, 0.5 lux, etc., in various embodiments. If the ambient light intensity detected is below the threshold low-light intensity, the low-light autofocus procedures described herein may be performed. If the ambient light intensity is greater than or equal to the threshold low-light intensity, the low-light autofocus procedures described herein may not be performed or may be performed with modifications (e.g., different exposure times). In some embodiments, an indication that a payload image is to be captured may include a mobile device (e.g., the digital camera device 100) receiving (e.g., via a user interface) an indication that a still image or video image is to be captured using the mobile device.

Alternatively, the low-light autofocus procedures described herein may be triggered when a user presses a shutter button (e.g., a physical shutter button on a DSLR or a shutter button on the UI of a mobile device) within a low-light mode (e.g., an application within a mobile device or tablet computing device) or otherwise selects a low-light mode. In such embodiments, the user may make a determination when the ambient light intensity is low enough to warrant an extended autofocus procedure and/or may provide an indication that she is willing to wait for an extended autofocus procedure to be executed.

In still other embodiments, the low-light autofocus procedures described herein may be triggered when a previous autofocus has been unsuccessful. For example, the preview frame 402 illustrated in FIG. 4 may have inadequate focus for a payload image, so the low-light autofocus procedure may be executed. Alternatively, a previously captured payload image could be deemed to have inadequate focus based on a previous autofocus procedure. Whether or not the previous autofocus was unsuccessful could be based on an indication from a user that the previous autofocus was inadequate. In other embodiments, an autofocus algorithm (e.g., a phase-detection autofocus algorithm used in preview mode) may provide an indication that the autofocus has failed. For example, the autofocus algorithm may provide a confidence value that indicates the probability that the autofocus was successful, and if that confidence value is below a certain threshold, it may be determined that the autofocus failed. An indication that the autofocus has failed may be provided by an API (e.g., an API for a camera module of the mobile device).

Upon the extended autofocus procedure engaging, an indication can be provided to a user (e.g., at the beginning of the extended autofocus procedure or throughout the duration of the autofocus procedure). For example, an indication could be displayed on the multi-element display 106 of the digital camera device 100 that says "extended autofocus being performed" or "please hold camera still, extended autofocus being performed" (i.e., an indication to the user of the camera to hold the camera still). The indication displayed on the multi-element display 106 of the digital camera device 100 could additionally or alternatively include a timer that indicates how much time remains in the extended autofocus procedure. Such an indication could be displayed on top of a shutter button engaged by the user, for example.

Figure 5A:
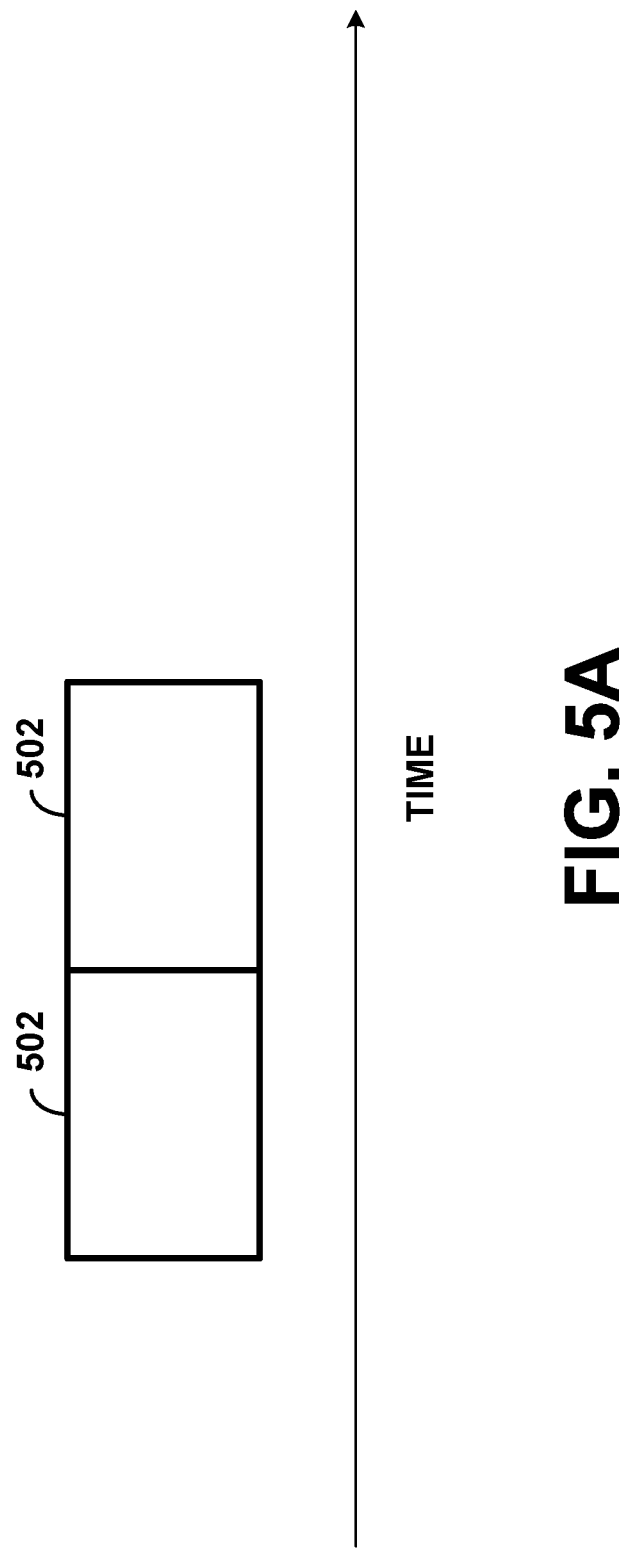
FIG. 5A is an illustration of a frame-capture timeline, according to example embodiments.

Once it has been determined that an autofocus procedure is to be executed, the number of frames and the duration of those frames may be determined and then the extended autofocus frames may be captured. For example. FIG. 5A illustrates a frame-capture timeline in line with the autofocus procedures described herein. As illustrated, the frame-capture timeline includes two extended frames 502 for use in an autofocus algorithm (e.g., a phase-detection autofocus algorithm). The exposure time for each of these extended frames 502 is indicated by their extent along the time axis in FIG. 5A. The exposure time for these extended frames 502 may be greater than an exposure time used for the payload image(s) after the autofocus technique is performed. One reason for this is that the autofocus algorithm (e.g., the phase-detection autofocus algorithm) may have enhanced motion-blur tolerance relative to a payload image. Because the two depictions of the scene captured in the extended frames 502 (e.g., similar to the first and second depictions of the scene 322, 324 illustrated in FIG. 3B) are captured simultaneously, motion blur does not adversely affect the extended frames 502 when those frames are used for phase-detection autofocus rather than generating a payload image.

The exposure time for the extended frames 502 may be determined based on a total time over which the autofocus procedure is to be performed and a number of frames to be captured during the autofocus procedure. For example, a user may indicate that she is accepting of 6.0 seconds to perform the extended autofocus procedure. If two frames are to be captured, that 6.0 second duration may be split equally across both frames giving each of the extended frames 502 3.0 seconds of exposure time. The amount of time a user is willing to dedicate to the extended autofocus procedure may be tunable (e.g., by the user).

As another example, the camera system may be in a handheld mode (e.g., if the camera system is a DSLR camera or a mobile phone), so it may be determined that 3.0 seconds are to be used to perform the extended autofocus procedure (e.g., instead of 6.0 seconds). If, again, there are two frames, each frame may be 1.5 seconds each. Alternatively, one frame may be 2.0 seconds while the other is 1.0 seconds. However, if the camera system is in a mounted or a "tripod" mode (e.g., if the camera system is a DSLR camera positioned on a tripod), it may be determined that 9.0 seconds are to be used to perform the extended autofocus procedure. If there are three frames to be captured, for example, each frame may have 3.0 seconds of exposure time. As described herein, the mode a camera system is operating in (e.g., handheld vs. mounted) may be used in determining the total time over which the autofocus procedure may be performed and/or the exposure time for individual frames to be captured.

In some embodiments, the exposure time for the extended frames 502 may also be determined based on the ambient light intensity of the environment (i.e., the brightness of the scene). The ambient light intensity may be determined based on the light intensity incident on the image sensor of the camera system (e.g., as captured in one or more preview frames or previous payload images) and/or based on an auxiliary sensor that detects light intensity. The greater the ambient light intensity, the less exposure time is necessary for adequate autofocus determinations to be made based on the captured frames. Hence, in low-light conditions, the exposure time for the extended frames 502 may be less than in ultra-low-light conditions.

The exposure time may also be based on a motion-blur tolerance. The motion-blur tolerance may depend directly on the phase-detection autofocus algorithm that is to be executed on the extended frames 502 once they are captured. Alternatively, the motion-blur tolerance may be determined based on the motion of subject(s) in the scene, as described with reference to FIG. 5D below.

Other methods of determining the total time for exposure of the extended frames 502 are also possible and described and contemplated herein.

After calculating the exposure time for the extended frames 502, the extended frames 502 may be captured (e.g., using an API call within the camera application of a mobile computing device). For example, each of the extended frames 502 could be captured using an exposure time of 1.0 second each, 1.5 seconds each, 2.0 seconds each, 2.5 seconds each, 3.0 seconds each, 3.5 seconds each, 4.0 seconds each, etc. While FIG. 5A illustrates two extended frames 502, it is understood that other numbers of extended frames 502 could be captured for the purpose of autofocus (e.g., one, three, four, five, six, seven, eight, nine, ten, fifteen, twenty, etc.). Only one extended frame 502 is necessary to perform phase-detection autofocus. However, it may be beneficial to use additional extended frame(s) 502 to improve the resolution of the in-focus lens setting and/or to confirm that the in-focus lens setting determined based on the first extended frame 502 was determined correctly. Once captured, the extended frames 502 may be used for an autofocus procedure (e.g., fed into a phase-detection autofocus algorithm).

As described throughout, phase-detection autofocus procedures may be used to determine the proper lens setting for a camera system to bring subjects of a frame into focus prior to capturing a payload image. However, it is understood that other autofocus techniques are understood and could alternatively be used. For example, contrast-detection autofocus could be used. In embodiments using contrast-detection autofocus, additional frames may be captured to perform autofocus, with each frame being captured at a different focus setting. This may include capturing additional extended frames 502, possibly using different exposure times. Contrast-detection autofocus may also take longer as the lens setting may change between exposures (which can take time), as well as because additional extended frames 502 may be captured. Further, contrast-detection autofocus may have lower motion-blur tolerance because contrast-detection autofocus is reliant on successively captured frames, rather than on single/simultaneously captured frames where motion blur will be equally prevalent in all depictions of the scene (as in phase-detection autofocus). Hence, due to the lower motion-blur tolerance of a contrast-detection autofocus algorithm, the exposure time for the extended frames 502 when using contrast-detection autofocus may be limited. This may correspondingly reduce performance in low-light conditions. However, there is nothing that prevents contrast-detection autofocus from being used herein and nothing in this disclosure should be read so as to preclude the use of contrast-detection autofocus or other autofocus techniques besides phase-detection autofocus.

In some embodiments, the exposure time for one of the extended frames 502 may not be the same as for the rest of the extended frames 502. For example, as illustrated in FIG. 5B, the first of the extended frames 502 may have a longer exposure time than the second of the extended frames 502. In some embodiments, the second or subsequent extended frames 502 may be present to either provide fine (as opposed to coarse) adjustments to the focus setting for the camera system or to confirm the focus setting for the camera system determined based on the first of the extended frames 502. As such, the exposure time for the second extended frame 502 may be shorter than the exposure time for the first extended frame 502. In other embodiments, the second or subsequent extended frames 502 may be longer than the first extended frame 502.

In addition, in some embodiments, additional frames may be captured after the extended frames 502. For example, as illustrated in FIG. 5C, multiple payload frames 522 may be captured after the extended frames 502. Prior to capturing the payload frames 522, there may be a brief resting period (indicated in FIG. 5C by the open space along the time axis between the extended frames 502 and the payload frames 522). The resting period may allow for the lens and/or image sensor to be moved within the camera system based on the focus setting determined by the extended frames 502 (i.e., allows the camera system time to readjust such that the scene is in focus). This ensures that the payload image is not captured while the lens and/or the image sensor are still in motion. In some embodiments, the resting period may include requesting an additional frame using an API, but then not using the requested frame and/or disposing of the requested frame.

The plurality of payload frames 522 may be captured and used to generate a payload image. As illustrated, each of the payload frames 522 may be captured using a different exposure time than was used for the extended frames 502 (e.g., a shorter exposure time than was used for the extended frames 502). In some embodiments, as illustrated in FIG. 5C, the payload frames 522 may all be captured using the same exposure time as one another. In other embodiments, the payload frames 522 may be captured using two or more different exposure times. To generate the payload image, the payload frames 522 may be aligned such that similar objects in the payload frames 522 are in similar pixel locations within each of the payload frames 522 (e.g., so the subject of the payload frame 522 is in the same position within each of the payload frames 522). Generating the payload image may also include forming a composite image based on the aligned payload frames 522.

In some embodiments, generating the payload image using the payload frames 522 may include enhancing the composite image using a fast Fourier color constancy algorithm. Further, generating the payload image may include determining an optimized tone mapping for the composite image generated from the payload frames 522 and modifying the composite image generated from the payload frames according to the optimized tone mapping. The payload image generated may be a high dynamic range (HDR) image that is enhanced in low-light conditions based on the extended autofocus procedure described herein.

Figure 5D:
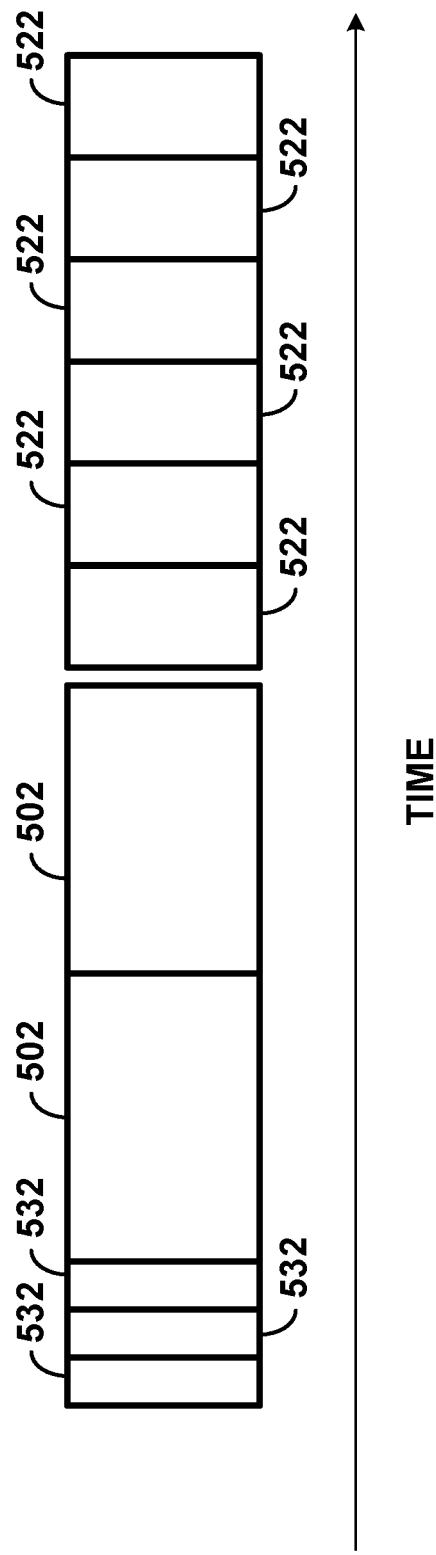
FIG. 5D is an illustration of a frame-capture timeline, according to example embodiments.

In some embodiments, the exposure time for the extended frames 502 may be based on a motion-blur tolerance. The motion-blur tolerance may depend on the autofocus algorithm being used (e.g., hard-coded into the autofocus algorithm). Alternatively, the motion-blur tolerance may be based on the subjects in a given scene. For example, as illustrated in FIG. 5D, preview frames 532 could be captured prior to capturing the extended frames 502. A center-weighted average of motion (or other metric of motion) across the plurality of preview frames 532 may then be determined and the motion-blur tolerance may be based on this center-weighted average. The center-weighted average looks at the motion of objects (e.g., bright objects, such as taillights on vehicles) from one preview frame 532 to the next and more heavily weights motion occurring in the center of the frames because that motion is more likely to constitute an important subject within the frames. Based on this center-weighted average, an amount of motion in a scene can be detected. The more motion that is present in a scene, the greater the motion blur from frame to frame and, therefore, generally, the shorter the acceptable exposure time.

Additionally or alternatively, the motion of one or more region(s) of interest within the preview frames 532 may be tracked to determine the motion-blur tolerance used in determining the exposure time of the extended frames 502. The region(s) of interest within the preview frames 532 may be identified by a user (e.g., by a user selecting one or more regions or objects in the preview frames 532 using a UI) or identified by a computing device (e.g., a processor executing a machine-learned facial recognition algorithm or a machine-learned object detection and identification algorithm). The region(s) of interest may be identified within the first preview frame 532 and then, based on the region(s) of interest in the first preview frame 532 and corresponding region(s) of interest in subsequent preview frames 532, exposure times for use in capturing the extended frames 502 may be used.

As stated above, the preview frames 532 may be captured prior to capturing the extended frames 502. The preview frames 532 may be used for other purposes in addition to determining exposure time (e.g., based on motion-blur tolerance and ambient light intensity) for the extended frames 502. For example, many cameras may include a viewfinder. When the camera's aperture is open and/or when the camera is otherwise ready to capture a payload image, preview frames 532 may be displayed in the viewfinder. These preview frames 532 may be refreshed at a particular rate, referred to as the viewfinder refresh rate. In some cases, the viewfinder refresh rate is 15 Hz or 30 Hz, but other rates may be used. These refresh rates define the viewfinder's refresh time interval, which is the amount of time between refreshes. The refresh time interval is the inverse of the refresh rate—thus, a refresh rate of 30 Hz has a refresh time interval of 33.33 milliseconds, while a refresh rate of 15 Hz has a refresh time interval of 66.66 milliseconds.

A user may utilize the preview frames 532 to aim, focus, or otherwise adjust the image capture device. In some embodiments, a user may select a region of interest within one or more of the preview frames 532 based on what subjects are depicted within the preview frame. For example, if a person is depicted in the preview frames 532 in front of a landscape, a user may select the entire person or a facial region of the person as a region of interest for subsequent capture in a payload image. In some scenarios, once the user is satisfied by what he or she sees on the viewfinder, the user triggers the image capture device's shutter function (e.g., using a shutter button). This may result in a payload image being captured (e.g., with higher resolution than the viewfinder frames). The payload image may be stored to memory and/or presented to the user as the actual photographed image. The user may then share, print, or further manipulate this payload image.

As described above, standard autofocus (e.g., phase-detection autofocus) on preview frames with shorter exposure times than the extended frames 502 can be attempted prior to determining that an extended autofocus technique is to be performed. This may also be illustrated by FIG. 5D. A series of preview frames 532 are captured (e.g., using a shorter exposure time than the exposure time for the extended frames 502) prior to capturing the extended frames 502. If the standard autofocus fails on the preview frames 532, the extended autofocus may be triggered, thereby causing the extended frames 502 to be captured/analyzed. As also described above, the preview frames 532 can be used to compute a center-weighted average of motion in order to determine the motion-blur tolerance.

It is understood that the relative durations of the exposure times illustrated in FIG. 5D are illustrative only and not necessarily to scale. Other exposure times for the preview frames 532, the extended frames 502, and/or the payload frames 522 may be possible. Additionally, other numbers of preview frames 532, extended frames 502, and/or payload frames 522 are also possible.

Figure 6A:
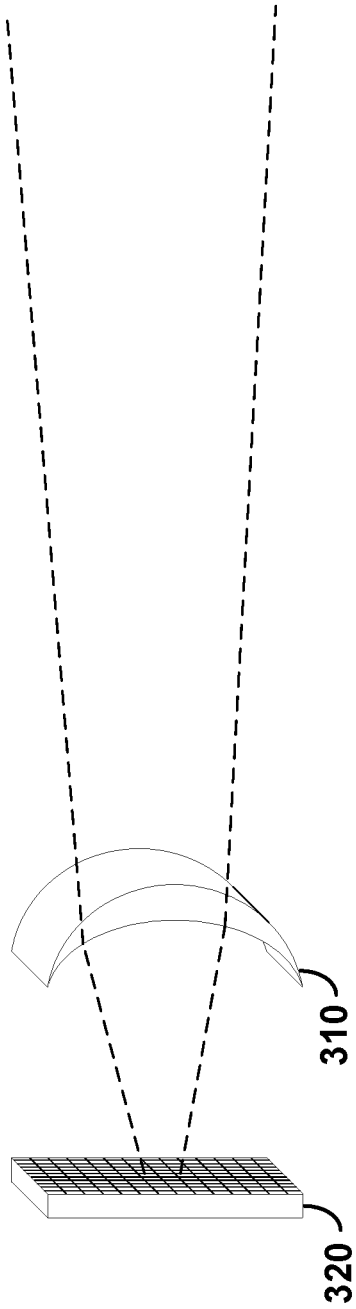
FIG. 6A is an illustration of a portion of a lens-adjustment procedure, according to example embodiments.
Figure 6B:
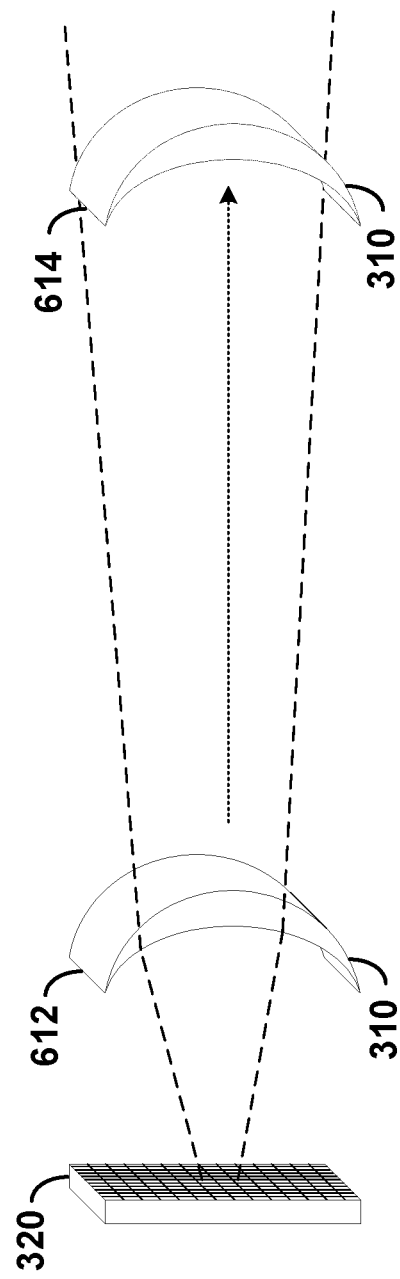
FIG. 6B is an illustration of a portion of a lens-adjustment procedure, according to example embodiments.

As described above, the lens 310 of a camera system may be moved relative to the image sensor 320 in response to a determination of an in-focus lens setting using captured extended frames 502. Such a movement is depicted in FIGS. 6A and 6B. It is understood that other changes to the lens 310 (besides simply repositioning the lens 310) could be made to match the in-focus lens setting in response to a confidence level of the determined in-focus setting being greater than or equal to the confidence threshold. For example, the lens 310 could be warped and/or deformed so as to change its focal length.

The arrangement illustrated in FIG. 6A may show one position of the lens 310 (e.g., a pre-autofocus setting 612, as depicted in FIG. 6B) relative to the image sensor 320 prior to performing the extended autofocus procedure (e.g., prior to when the extended frames 502 are captured). Unlike in FIGS. 6A and 6B, in some embodiments, the lens 310 may be positioned at a middle focal position for the lens 310 (e.g., at a midpoint of all possible positions of the lens 310 within the camera system). In this way, the value of d, as illustrated in FIGS. 3A-3C, for example, is equally as likely to be positive as it is to be negative. Said another way, a priori, a positive adjustment to the lens 310 is just as likely to bring the scene into focus as a negative adjustment to the lens 310. This may reduce the amount of adjustment necessary after the extended autofocus technique is performed to bring the camera system in line with the in-focus lens setting. Similarly, the midpoint can lead to enhanced accuracy for autofocus determination (e.g., the phase-detection autofocus algorithm may be more accurate when assessing values of d that are closer to 0). It is understood that other locations of the lens 310 relative to the image sensor 320 (e.g., other than the middle focal position and the position illustrated in FIG. 6A) may be used for the pre-autofocus setting 612.

In some embodiments, the pre-autofocus setting for the lens 310 may be the same position prior to each extended autofocus procedure. For example, the lens 310 may be moved to the same position relative to the image sensor 320 prior to each execution of the extended autofocus procedure. This position may be referred to as a pre-autofocus setting 612 (e.g., as depicted in FIG. 6B). Using the same pre-autofocus setting 612 prior to each extended autofocus procedure may mean that the results of one extended autofocus procedure can be compared against other extended autofocus procedures. Hence, the results of previously performed extended autofocus techniques can be used to enhance additional enhanced autofocus techniques.

As described above, the extended autofocus procedure may result in a determined in-focus lens setting and a confidence level. The confidence level may be output from the phase-detection autofocus algorithm (e.g., based on the ambient light intensity, the amount of motion in the scene, the objects in the scene, the relative separation between the various intensity peaks and valleys in the captured frame(s), etc.). Thereafter, the confidence level may be compared to a confidence threshold. The confidence threshold may be selectable/tunable by a user, may be stored in a memory associated with the camera system, and/or may be determined based on the phase-detection autofocus algorithm used. If the confidence level is greater than or equal to the confidence threshold, the lens 310 may be moved or otherwise adjusted to satisfy the in-focus lens setting. For example, as illustrated in FIG. 6B, the lens 310 may be moved from the pre-autofocus setting 612 to the in-focus lens setting 614. Moving the lens 310 may include translating the lens 310 within the camera system using an electrically controlled stage and/or a motor, for example.

Figure 6C:
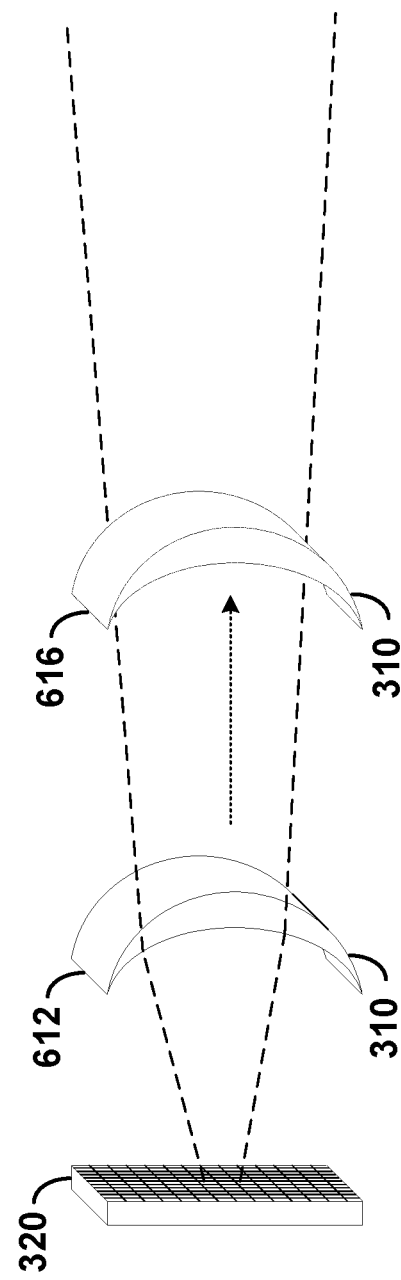
FIG. 6C is an illustration of a portion of a lens-adjustment procedure, according to example embodiments.

In cases where the determined confidence level is less than the confidence threshold, however, the lens 310 may not be moved to the determined in-focus lens setting. Instead, as illustrated in FIG. 6C, the lens 310 may be moved from the pre-autofocus setting 612 to a default setting 616. As with FIG. 6B, this movement may be performed using an electrically controlled stage and/or a motor. The default setting 616 may correspond to the middle focal position of the lens 310, in some embodiments. Alternatively, the default setting 616 may correspond to a maximum focal length for the lens 310. For example, the default setting 616 may be set such that a focal distance of infinity is as nearly approximated as possible by the camera system. In still other embodiments, the default setting 616 may correspond to a hyperfocal distance of the camera system (i.e., the focus setting that corresponds to a focal distance beyond which all objects in the scene can be brought into acceptable focus, where the acceptable focus may be defined by the circle of confusion diameter limit).

In some embodiments, regardless of the outcome of the comparison between the confidence level and the confidence threshold, the lens 310 may be moved to a default setting 616. For example, if the ambient light intensity is below 0.25 lux, 0.5 lux, 0.75 lux, 1.0 lux, etc., regardless of the computed confidence level and the value of the confidence threshold, the lens 310 may be moved to the default setting 616.

III. EXAMPLE PROCESSES

Figure 7:
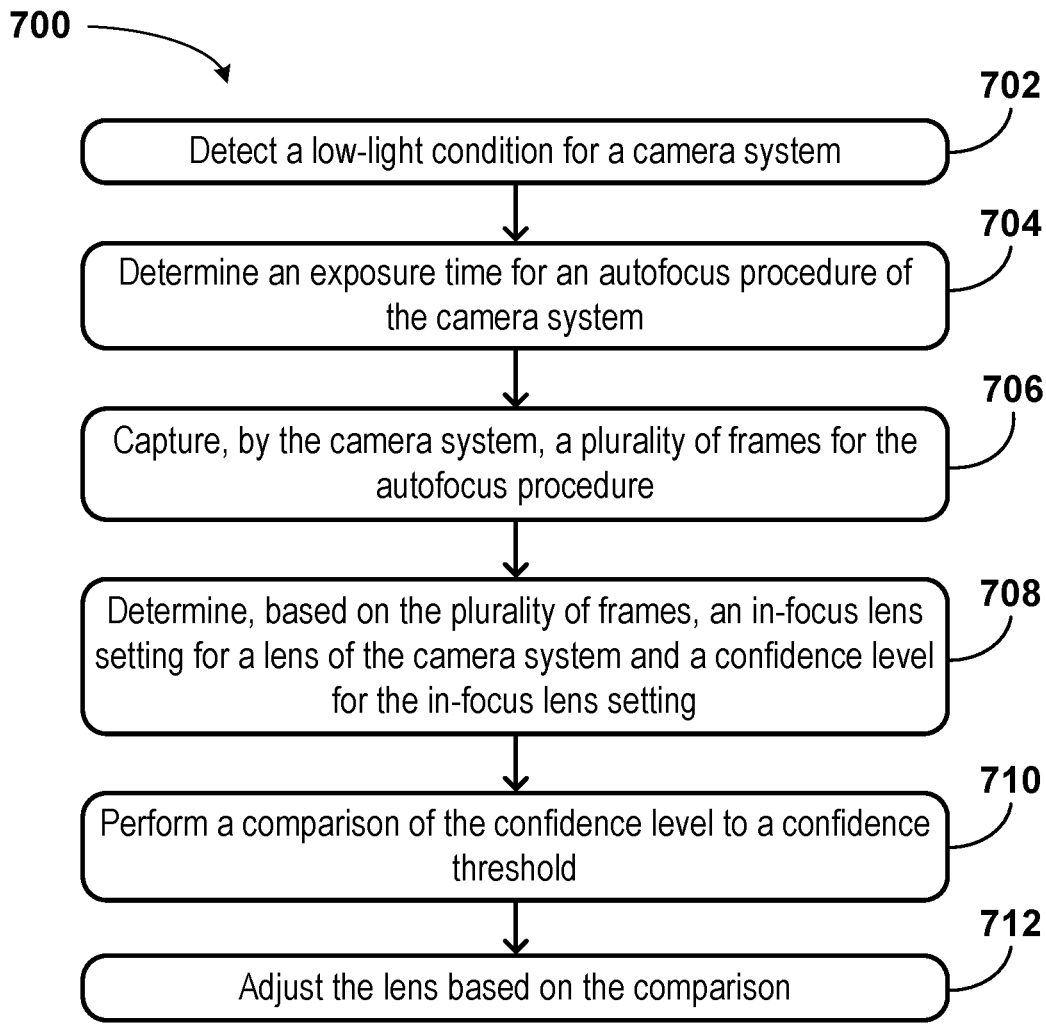
FIG. 7 is a flowchart illustrating a method, according to example embodiments.

FIG. 7 is a flowchart illustrating a method 700, according to example embodiments. The method 700 may be performed by the digital camera device 100 illustrated in FIG. 1 and/or the computing device 200 illustrated in FIG. 2, for example.

At block 702, the method 700 may include detecting a low-light condition for a camera system. The camera system may correspond to the digital camera device 100, in some embodiments.

In some embodiments, block 702 may include comparing an ambient light intensity to a threshold low-light intensity. For example, the threshold low-light intensity may be 1.0 lux.

At block 704, the method 700 may include determining an exposure time for an autofocus procedure of the camera system. Determining the exposure time may include determining the exposure time based on a motion-blur tolerance and the low-light condition.

In some embodiments, block 704 may include determining the exposure time based on a total time over which the autofocus procedure is to be performed and a number of frames to be captured during the autofocus procedure. For example, the camera system may be part of a mobile device or a DSLR camera and the total time may be based on a mode of operation of the camera system.

In some embodiments, block 704 may include determining the exposure time based on a tunable duration that represents an acceptable amount of time to dedicate to the autofocus procedure.

At block 706, the method 700 may include capturing, by the camera system, a plurality of frames for the low-light autofocus procedure. At least one of the extended frames may be captured by the camera system using the determined exposure time.

In some embodiments, at block 706, at least one of the extended frames may be captured by the camera system using an exposure time different than the determined exposure time.

At block 708, the method 700 may include determining, based on the plurality of captured frames, an in-focus lens setting for a lens of the camera system and a confidence level for the in-focus lens setting.

In some embodiments, block 708 may include applying a phase-detection autofocus algorithm. Further, the plurality of captured frames may include a first-captured frame and one or more subsequently captured frames captured after the first-captured frame. The method 700 may also include performing facial recognition on the first-captured frame to identify a region of interest in the first-captured frame and identifying corresponding regions of interest in the one or more subsequently captured frames. In addition, applying the phase-detection autofocus algorithm may include using the phase-detection autofocus algorithm to determine the in-focus lens setting based on the corresponding regions of interest in the subsequently captured frames.

At block 710, the method 700 may include performing a comparison of the confidence level to a confidence threshold.

At block 712, the method 700 may include adjusting the lens based on the comparison.

In some embodiments, block 712 may include adjusting the lens to match the in-focus lens setting in response to the confidence level being greater than or equal to the confidence threshold.

In some embodiments, block 712 may include adjusting the lens to a default lens setting in response to the confidence level being less than the confidence threshold. The default lens setting may provide a maximum focal length for the lens. Alternatively, the default lens setting may provide a focal length for the lens that corresponds to a hyperfocal distance of the camera system.

In some embodiments, the method 700 may also include capturing, by the camera system, a plurality of additional frames. Each of the additional frames may be captured by the camera system using a secondary exposure time. The secondary exposure time may be shorter than the determined exposure time. Further, the method 700 may include aligning the additional frames such that similar objects in the additional frames are in similar pixel locations within each of the additional frames. In addition, the method 700 may include forming a composite image based on the additional frames. In some embodiments, the method 700 may additionally include enhancing the composite image using a fast Fourier color constancy algorithm. Still further, the method 700 may include determining an optimized tone mapping for the composite image. Even further, the method 700 may include modifying the composite image according to the optimized tone mapping.

In some embodiments, the method 700 may include adjusting the lens to a pre-autofocus setting. The pre-autofocus setting may include a middle focal position for the lens.

In some embodiments, the camera system of method 700 may be a component of a mobile device. As such, the method 700 may include receiving, via a user interface of the mobile device, an indication that a still image or a video image is to be captured using the mobile device. Additionally or alternatively, the method 700 may include displaying, on a user interface of the mobile device, an indication to a user to hold the mobile device still.

In some embodiments, the method 700 may include capturing, by the camera system and prior to determining the exposure time, a plurality of preview frames. The motion-blur tolerance is based on a center-weighted average of motion across the plurality of preview frames.

In some embodiments, the method 700 may include determining the motion-blur tolerance based on a phase-detection autofocus algorithm.

IV. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

The computer-readable medium can also include non-transitory, computer-readable media such as computer-readable media that store data for short periods of time like register memory and processor cache. The computer-readable media can further include non-transitory, computer-readable media that store program code and/or data for longer periods of time. Thus, the computer-readable media may include secondary or persistent long term storage, like ROM, optical or magnetic disks, solid state drives, compact-disc read only memory (CD-ROM), for example. The computer-readable media can also be any other volatile or non-volatile storage systems. A computer-readable medium can be considered a computer-readable storage medium, for example, or a tangible storage device.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed:

1. A method comprising:
receiving an indication of a low-light condition for a camera system;
determining an extended exposure time for a low-light autofocus procedure of the camera system based on a motion-blur tolerance and the low-light condition;
capturing, by the camera system, an extended frame for the low-light autofocus procedure, wherein the extended frame is captured by the camera system using the determined extended exposure time; and
determining, based on the captured extended frame, an in-focus lens setting for a lens of the camera system.

2. The method of claim 1, further comprising:
adjusting the lens based on the determined in-focus lens setting.

3. The method of claim 1, further comprising:
determining a confidence level for the in-focus lens setting;
performing a comparison of the confidence level to a confidence threshold; and
adjusting the lens based on the comparison.

4. The method of claim 3, wherein adjusting the lens based on the comparison comprises:
adjusting the lens to match the in-focus lens setting in response to the confidence level being greater than or equal to the confidence threshold.

5. The method of any of claim 3, wherein adjusting the lens based on the comparison comprises:
adjusting the lens to a default lens setting in response to the confidence level being less than the confidence threshold.

6. The method of claim 5, wherein the default lens setting provides a maximum focal length for the lens.

7. The method of claim 5, wherein the default lens setting provides a focal length for the lens that corresponds to a hyperfocal distance of the camera system.

8. The method of claim 1, further comprising:
capturing, by the camera system, a plurality of extended frames for the low-light autofocus procedure, wherein determining the in-focus lens setting for the lens of the camera system is based upon the plurality of captured extended frames.

9. The method of claim 2, further comprising:
capturing, by the camera system using the adjusted lens, a second extended frame for the low-light autofocus procedure; and
determining, a second in-focus lens setting for the lens of the camera system based upon the second extended frame.

10. The method of claim 9, further comprising:
adjusting the lens based upon at least one of the following: the second in-focus lens setting, a confidence level associated with the second in-focus lens setting, and a confidence level associated with the in-focus lens setting determined prior to the second in-focus lens setting.

11. The method of claim 8, wherein at least one of the extended frames is captured by the camera system using an exposure time different than the determined extended exposure time.

12. The method of claim 1, further comprising:
capturing, by the camera system, a plurality of additional frames,
wherein each of the plurality of additional frames is captured by the camera system using a secondary exposure time, and
wherein the secondary exposure time is shorter than the determined extended exposure time;
aligning the plurality of additional frames such that similar objects in the additional frames are in similar pixel locations within each of the additional frames; and
forming a composite image based on the additional frames.

13. The method of claim 12, further comprising:
enhancing the composite image using a fast Fourier color constancy algorithm;
determining an optimized tone mapping for the composite image; and
modifying the composite image according to the optimized tone mapping.

14. The method of claim 1, further comprising:
detecting the low-light condition for the camera system.

15. The method of claim 14, wherein detecting the low-light condition for the camera system comprises:
comparing an ambient light intensity to a threshold low-light intensity.

16. The method of claim 15, wherein the threshold low-light intensity is 1.0 lux.

17. The method of claim 1, further comprising adjusting the lens to a pre-autofocus setting, wherein the pre-autofocus setting comprises a middle focal position for the lens.

18. The method of claim 1, wherein the camera system is a component of a mobile device.

19. The method of claim 18, further comprising:
receiving, via a user interface of the mobile device, an indication that a still image or video image is to be captured using the mobile device.

20. The method of claim 19, further comprising:
displaying, on the user interface of the mobile device, an indication to a user to hold the mobile device still.

21. The method of claim 1, wherein determining the extended exposure time further comprises:
determining the extended exposure time based on a total time over which the low-light autofocus procedure is to be performed and a number of frames to be captured during the low-light autofocus procedure.

22. The method of claim 21,
wherein the camera system is part of a mobile device or a digital single-lens reflex (DSLR) camera, and
wherein the total time is based on a mode of operation of the camera system.

23. The method of claim 1, wherein determining, based on the captured extended frame, the in-focus lens setting for the lens of the camera system comprises:
applying a phase-detection autofocus algorithm.

24. The method of claim 23, further comprising:
capturing a plurality of frames, wherein the plurality of captured frames includes a first-captured frame and one or more subsequently captured frames captured after the first-captured frame; and
performing facial recognition on the first-captured frame to identify a region of interest in the first-captured frame and identifying corresponding regions of interest in the one or more subsequently captured frames,
wherein applying the phase-detection autofocus algorithm comprises using the phase-detection autofocus algorithm to determine the in-focus lens setting based on the corresponding regions of interest in the one or more subsequently captured frames.

25. The method of claim 1, wherein determining the extended exposure time further comprises:
  determining the extended exposure time based on a tunable duration that represents an acceptable amount of time to dedicate to the low-light autofocus procedure.

26. The method of claim 1, further comprising:
  capturing, by the camera system and prior to determining the extended exposure time, a plurality of preview frames,
  wherein the motion-blur tolerance is based on a center-weighted average of motion across the plurality of preview frames.

27. The method of claim 1, further comprising:
  determining the motion-blur tolerance based on a phase-detection autofocus algorithm.

28. A non-transitory, computer-readable medium having instructions stored therein, wherein the instructions, when executed by a processor, perform a method comprising:
  receiving an indication of a low-light condition for a camera system;
  determining an extended exposure time for a low-light autofocus procedure of the camera system based on a motion-blur tolerance and the low-light condition;
  causing the camera system to capture an extended frame for the low-light autofocus procedure, wherein the extended frame is captured by the camera system using the determined extended exposure time; and
  determining, based on the captured extended frame, an in-focus lens setting for a lens of the camera system.

29. A mobile device comprising:
  a camera system comprising:
  an image sensor; and
  a lens configured to modify light from an environment surrounding the mobile device prior to the light being detected by the image sensor; and
  a controller, wherein the controller is configured to:
  receive an indication of a low-light condition for the camera system;
  determine an extended exposure time for a low-light autofocus procedure of the camera system based on a motion-blur tolerance and the low-light condition;
  cause the camera system to capture an extended frame for the low-light autofocus procedure, wherein the extended frame is captured by the camera system using the determined extended exposure time; and
  determine, based on the captured extended frame, an in-focus lens setting for the lens.

* * * * *